US009210364B2

(12) United States Patent
Shalam et al.

(10) Patent No.: US 9,210,364 B2
(45) Date of Patent: *Dec. 8, 2015

(54) ENTERTAINMENT SYSTEM MOUNTABLE IN A VEHICLE AND METHODS FOR MOUNTING AND DISPLAYING SAME

(71) Applicant: VOXX INTERNATIONAL CORPORATION, Hauppauge, NY (US)

(72) Inventors: David M. Shalam, Syosset, NY (US); Joseph C. Caltabiano, Hauppauge, NY (US); George C. Schedivy, Aqueboque, NY (US); James R. Tranchina, Dix Hills, NY (US)

(73) Assignee: VOXX INTERNATIONAL CORPORATION, Hauppauge, NY (US)

(*) Notice: Subject to any disclaimer, the term of this patent is extended or adjusted under 35 U.S.C. 154(b) by 32 days.

This patent is subject to a terminal disclaimer.

(21) Appl. No.: 13/945,400

(22) Filed: Jul. 18, 2013

(65) Prior Publication Data

US 2013/0300950 A1 Nov. 14, 2013

Related U.S. Application Data

(63) Continuation of application No. 12/862,101, filed on Aug. 24, 2010, now Pat. No. 8,520,152, which is a continuation-in-part of application No. 11/557,177, filed on Nov. 7, 2006, now Pat. No. 7,780,231, said application No. 12/861,101 is a continuation-in-part of application No. 10/688,611, filed on Oct. 17, 2003, now Pat. No. 7,679,578, which is a continuation-in-part of application No. 10/438,724, filed on May 15, 2003, now Pat. No. 7,245,274.

(60) Provisional application No. 60/734,337, filed on Nov. 7, 2005.

(51) Int. Cl.
*H04N 5/64* (2006.01)
*B60R 11/02* (2006.01)
*B60R 11/00* (2006.01)

(52) U.S. Cl.
CPC .............. *H04N 5/64* (2013.01); *B60R 11/0235* (2013.01); *B60R 2011/0017* (2013.01)

(58) Field of Classification Search
CPC ................... B60R 11/0235; B60R 2011/0017; H04N 5/64
USPC .......................................................... 348/837
See application file for complete search history.

(56) References Cited

U.S. PATENT DOCUMENTS

| 5,267,775 | A | 12/1993 | Nguyen | |
|---|---|---|---|---|
| 6,522,368 | B1 * | 2/2003 | Tuccinardi et al. | 348/837 |
| 6,663,155 | B1 * | 12/2003 | Malone et al. | 296/37.8 |
| 7,894,003 | B2 * | 2/2011 | Chang | 348/837 |
| 2002/0163215 | A1 * | 11/2002 | Emerling et al. | 296/24.1 |
| 2003/0137584 | A1 * | 7/2003 | Norvell et al. | 348/61 |
| 2004/0224638 | A1 * | 11/2004 | Fadell et al. | 455/66.1 |

FOREIGN PATENT DOCUMENTS

| EP | 1442936 | 8/2004 | |
|---|---|---|---|
| FR | 2829980 | 3/2003 | |
| WO | WO0038951 A1 * | 7/2000 | B60R 11/02 |
| WO | 2004105373 | 12/2004 | |

OTHER PUBLICATIONS

European Search Report dated Jan. 16, 2014 corresponding to European Appln. No. 13182344.5.

* cited by examiner

*Primary Examiner* — Mohammed Rahaman
(74) *Attorney, Agent, or Firm* — F. Chau & Associates, LLC

(57) ABSTRACT

A media system for a vehicle comprises a housing mounted to an overhead portion of the vehicle, and a media unit that is capable of being coupled to the housing, wherein the housing includes a receiving portion that pivots with respect to the housing and receives the media unit in the receiving portion.

4 Claims, 36 Drawing Sheets

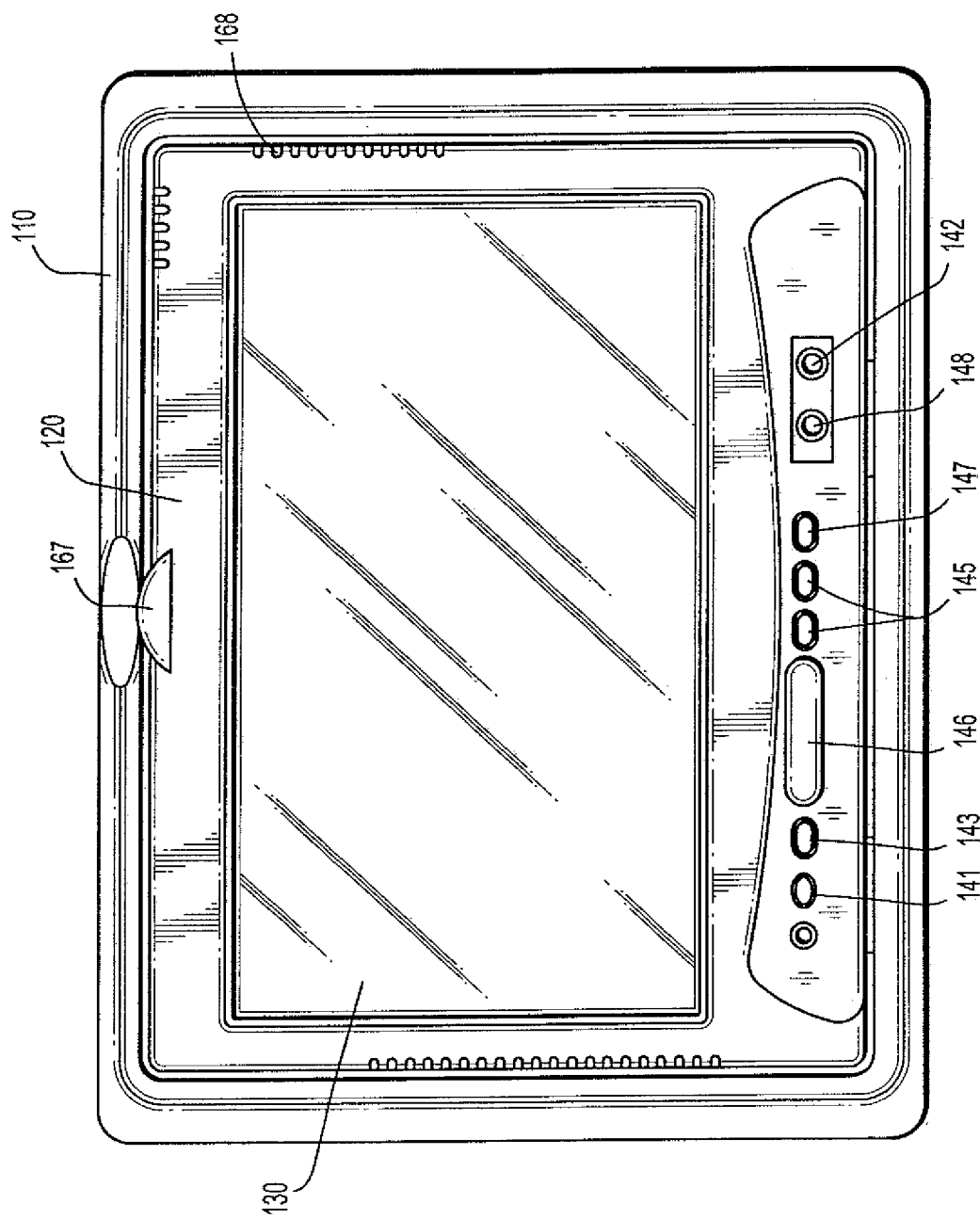

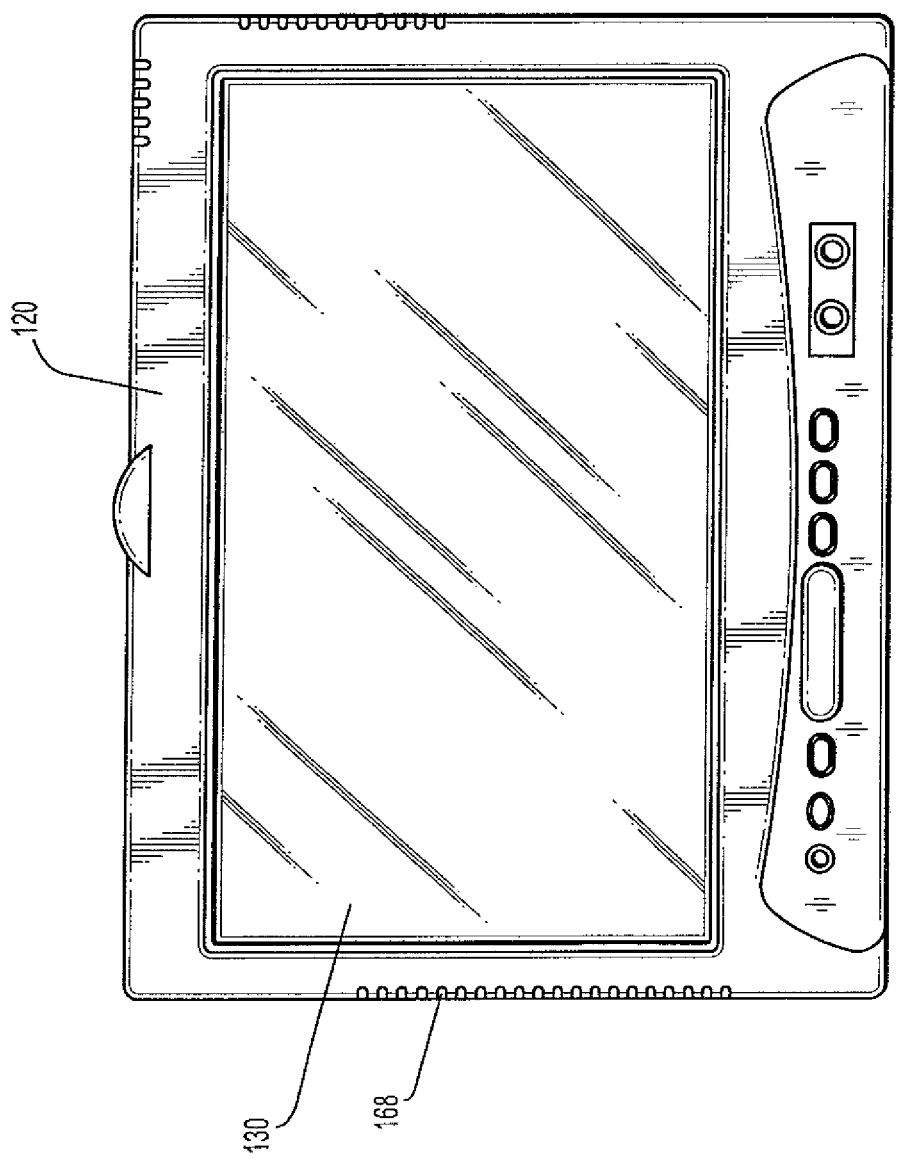

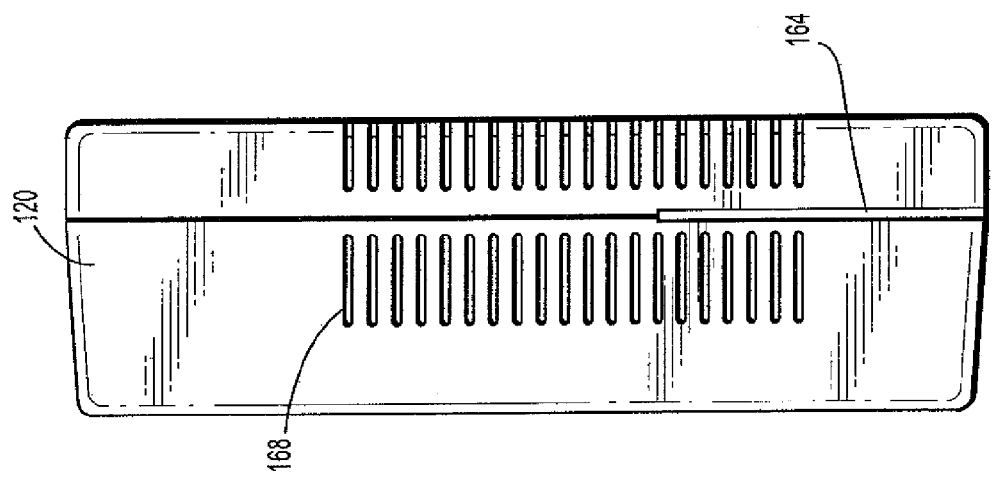

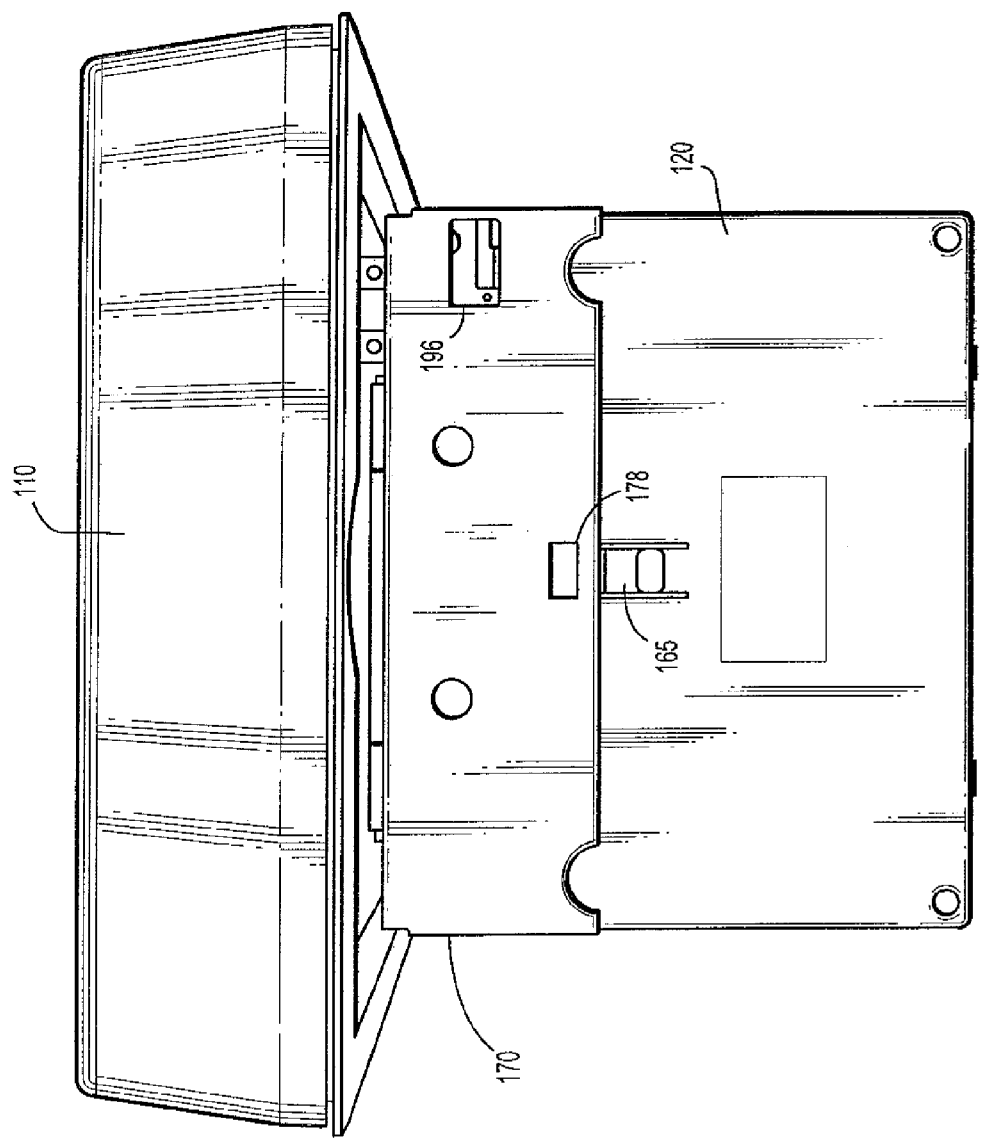

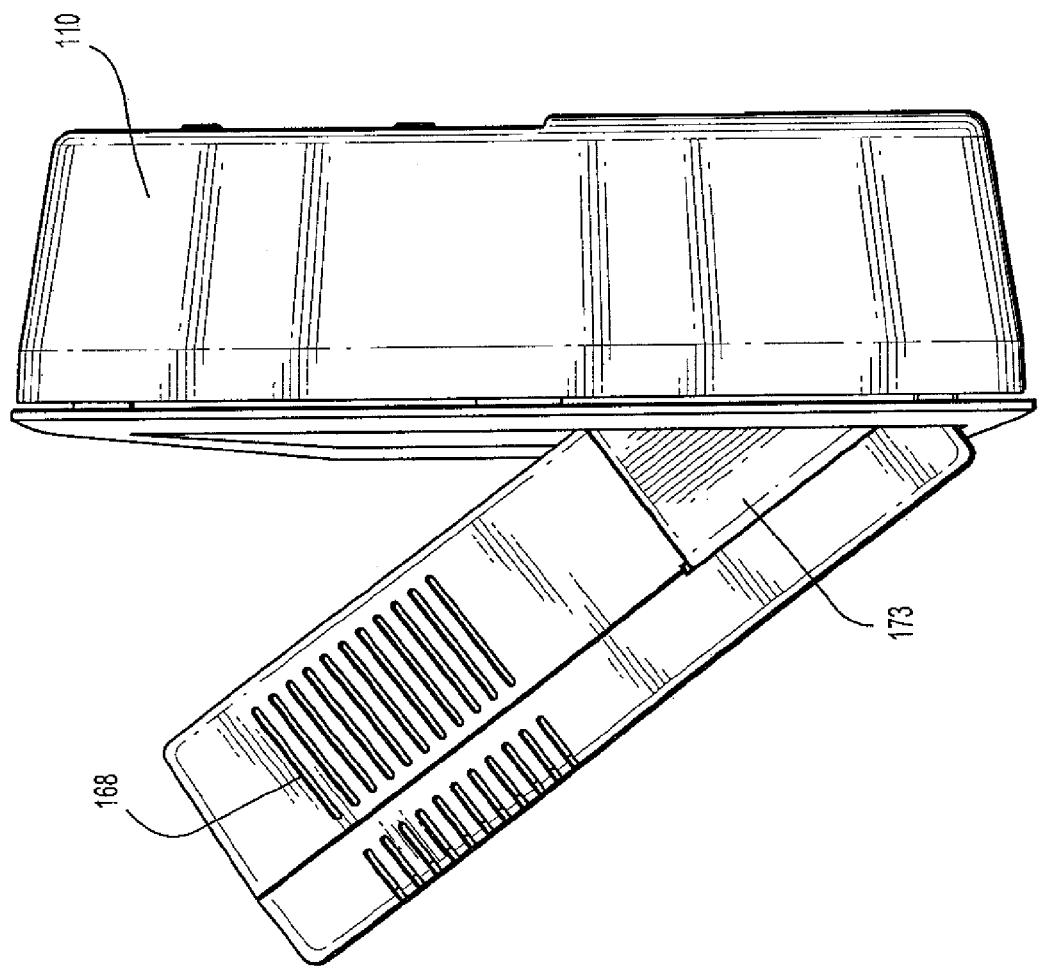

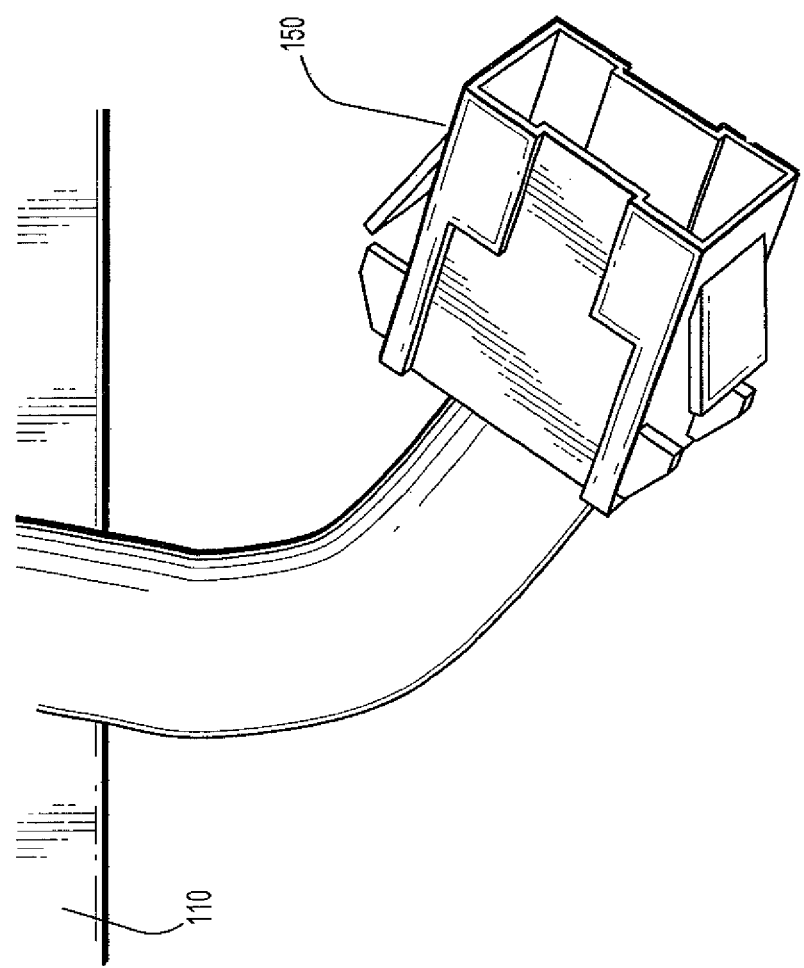

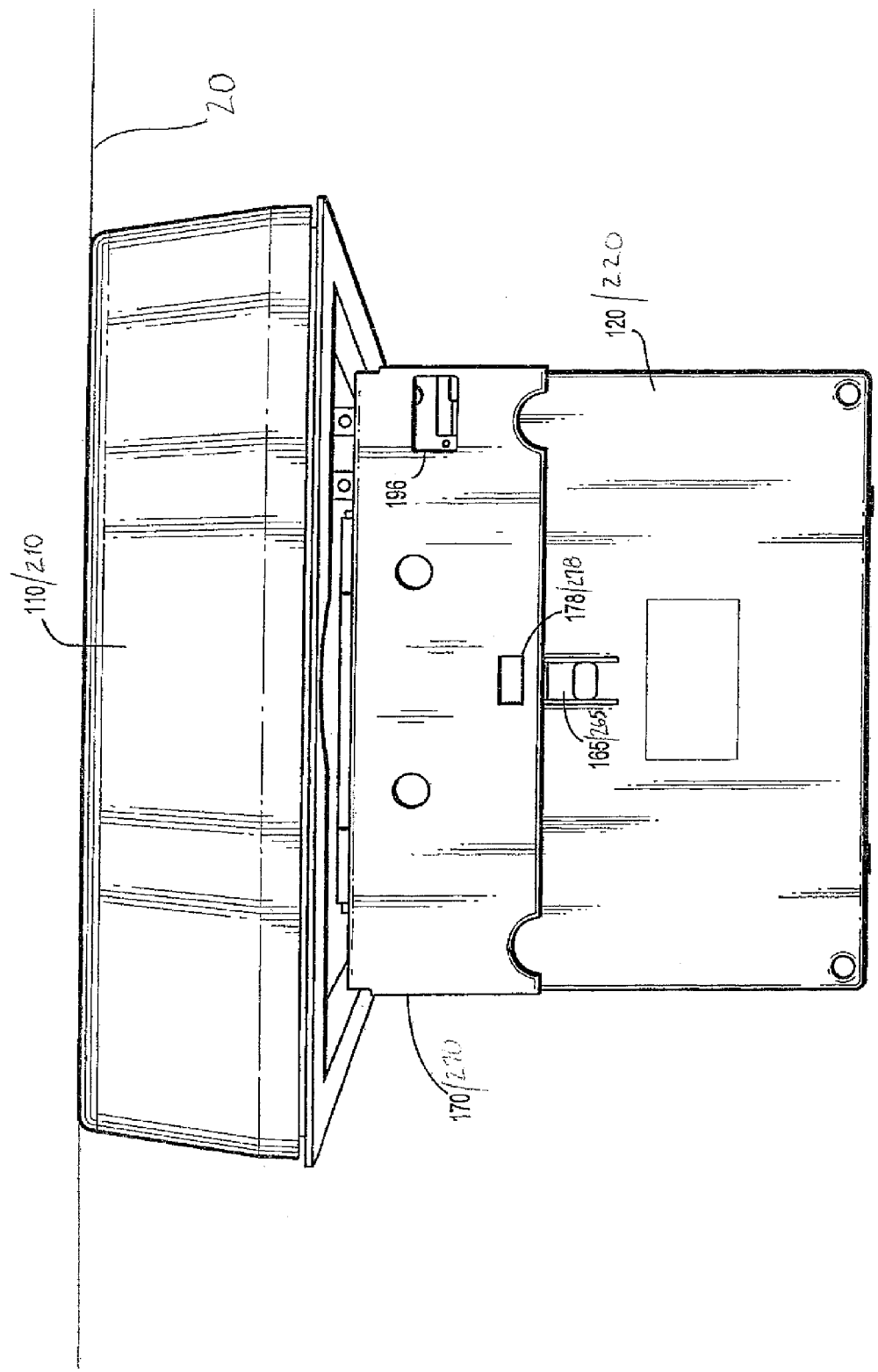

ENTERTAINMENT SYSTEM MOUNTABLE IN A VEHICLE AND METHODS FOR MOUNTING AND DISPLAYING SAME

CROSS-REFERENCES TO RELATED APPLICATIONS

This application is a Continuation of application Ser. No. 12/862,101, filed on Aug. 24, 2010, which is a Continuation-In-Part of application Ser. No. 11/557,177, filed on Nov. 7, 2006, now U.S. Pat. No. 7,780,231, which claims the benefit of Provisional Application Ser. No. 60/734,337, filed on Nov. 7, 2005, and is a Continuation-In-Part of application Ser. No. 10/688,611, filed on Oct. 17, 2003, which is a Continuation-In-Part of application Ser. No. 10/438,724, filed on May 15, 2003, the disclosures of which are herein incorporated by reference in their entireties.

BACKGROUND OF THE INVENTION

1. Technical Field

The present disclosure relates to an entertainment system capable of being mounted in a vehicle.

2. Discussion of the Related Art

As society becomes more mobile and therefore spends a greater amount of time traveling and away from home, demand rises for electronic appliances and devices outside the home environment. For example, media units including video screens have been mounted in the headrests and to overhead portions, such as ceilings, of vehicles, facilitating video entertainment on the road. These media units may play video and audio from different media sources located in different portions of the vehicle.

When selling a vehicle, new and used vehicle dealerships may give consumers the option of installing a vehicle entertainment system. In such a situation, the dealerships may want to show an example of an installed entertainment system to a prospective purchaser.

Therefore, a need exists for a vehicle entertainment system that can be easily mounted to or removed from a seat or other mounting location, such as a vehicle ceiling, and a process for displaying the vehicle entertainment systems that allows for easy installation or removal of an entertainment system depending on whether a purchaser chooses the entertainment system as an option in the vehicle.

SUMMARY OF THE INVENTION

A media system for a vehicle having a seat, in accordance with an embodiment of the present invention, comprises a housing mounted to the seat, and a media unit capable of being coupled to the housing, wherein the housing includes a receiving portion that pivots with respect to the housing and receives the media unit therein.

The receiving portion may comprise a first side portion and second side portion, wherein the first and second side portions include first and second extensions for engaging respective grooves on a first side surface and a second side surface of the media unit. The first and second extensions may each comprise a folded portion positioned at an angle with the first and second side portions, respectively. The grooves may have different widths along the length of the grooves.

The receiving portion may comprise a hole in a side thereof for receiving a flexible member formed on a surface of the media unit. The flexible member may include a lip portion that passes through the hole.

The receiving portion may be attached to the housing with a hinge, and comprise a bottom side, a left side, a right side, and a rear side.

The media unit may comprise a media player and a display for displaying video from the media player.

The media unit may comprise a first electrical connector positioned therein, and the receiving portion may comprise a second electrical connector mounted thereto that mates with the first electrical connector. The second electrical connector may protrude from a surface of the receiving portion and be inserted through a hole in the media unit to mate with the first electrical connector when the media unit is received by the receiving portion.

The receiving portion may include a plurality of protruding portions positioned on a side thereof, wherein the protruding portions fit in a corresponding plurality of holes formed in the media unit for securing the media unit to the receiving portion.

The receiving portion may comprise a tab portion extending from each of the first and second side portions, wherein each tab portion fits into any one of a plurality of indentations formed on corresponding first and second sides of the housing to restrict an angle of rotation of the receiving portion with respect to the housing. The plurality of indentations may be formed along a curve corresponding to the rotation of the receiving portion with respect to the housing.

The housing may be mounted to a headrest of the seat, and the receiving portion may surround the media unit on at least two sides of the media unit.

A housing for a media system mounted to a seat in a vehicle, in accordance with an embodiment of the present invention, comprises a receiving portion pivotably coupled to the housing for receiving a media unit therein, wherein the media unit is inserted into the receiving portion to couple the media unit to the housing.

The media unit may include a groove formed in a surface thereof for engaging an extended portion of the receiving portion to secure the media unit to the receiving portion. The media unit may include a flexible member, and the receiving portion may include a hole formed therein through which at least part of flexible member passes to secure the media unit to the receiving portion.

The receiving portion may comprise an electrical connector mounted thereto and protruding from a surface of the receiving portion, wherein, when the media unit is inserted into the receiving portion, the electrical connector passes through a hole in the media unit to mate with an electrical connector positioned in the media unit.

The receiving portion may be pivotably coupled to the housing using a hinge, and may comprise a bottom side, a left side, a right side, and a rear side.

A method for displaying a media system for a vehicle seat, in accordance with an embodiment of the present invention, comprises installing a housing having a pivotable receiving portion in a headrest, securing the headrest to the vehicle seat, and inserting a mock-up media unit into the receiving portion.

The method may further comprise removing a factory headrest from the vehicle prior to securing the headrest including the housing to the vehicle seat. The method may also comprise removing the headrest including the housing from the vehicle seat and replacing it with the factory headrest if a consumer determines that it does not want the media system.

The method may further comprise removing the mock-up media unit from the housing, replacing the mock-up media unit with an actual media unit, and electrically connecting the media system including the actual media unit to the vehicle.

A media system for a vehicle, in accordance with an embodiment of the present invention, comprises a housing mounted to an overhead portion of the vehicle, and a media unit capable of being coupled to the housing, wherein the housing includes a receiving portion that pivots with respect to the housing and receives the media unit therein, the receiving portion pivots between a closed position and open positions where the receiving portion is at an angle with respect to the housing, the media unit comprises a first electrical connector positioned therein, the receiving portion comprises a second electrical connector mounted thereto, and the second electrical connector mates with the first electrical connector, and the second electrical connector protrudes from a surface of the receiving portion and is inserted through a hole in the media unit to mate with the first electrical connector when the media unit is received by the receiving portion.

The housing may be mounted to a ceiling of the vehicle.

BRIEF DESCRIPTION OF THE DRAWINGS

Exemplary embodiments of the present invention will be described below in more detail, with reference to the accompanying drawings:

FIG. 1B shows a front view of the portable entertainment system including the media unit coupled to the housing, according to an embodiment of the present invention;

FIG. 2A shows a front view of the media unit removed from the housing, according to an embodiment of the present invention;

FIG. 2C shows a right side view of the media unit removed from the housing, according to an embodiment of the present invention;

FIG. 4B shows a top view of the portable entertainment system including the media unit in a pivoted position with respect to the housing, according to an embodiment of the present invention;

FIG. 4C shows a left side view of the portable entertainment system including the media unit in a pivoted position with respect to the housing, according to an embodiment of the present invention;

FIG. 5A shows a perspective view of a wired connection running from the media unit through the housing, according to an embodiment of the present invention;

FIG. 12 shows a front view of the portable entertainment system including the media unit in a pivoted position with respect to the housing mounted to an overhead portion of the vehicle, according to an embodiment of the present invention.

DETAILED DESCRIPTION OF EXEMPLARY EMBODIMENTS

Exemplary embodiments of the present invention now will be described more fully hereinafter with reference to the accompanying drawings. This invention may, however, be embodied in many different forms and should not be construed as limited to the embodiments set forth herein.

An entertainment system 100 includes a housing 110 mounted in a headrest 10 of a seat of a vehicle, such as an automobile, minivan or sport utility vehicle (SUV) to provide media, such as video and audio to rear seat passengers. Alternatively, the entertainment system and housing may be mounted in a body of seat. In another alternative, the entertainment system and the housing may be mounted to an overhead portion of the vehicle, such as a ceiling of the vehicle. Other mounting locations, such as the vehicle's dashboard and center console, or any accessible surface inside the vehicle, are also contemplated. The entertainment system 100 further includes a media unit 120 that can be easily coupled to and removed from the housing 110. The media unit 120 may be operational when coupled to or removed from the housing.

Figure 1A:
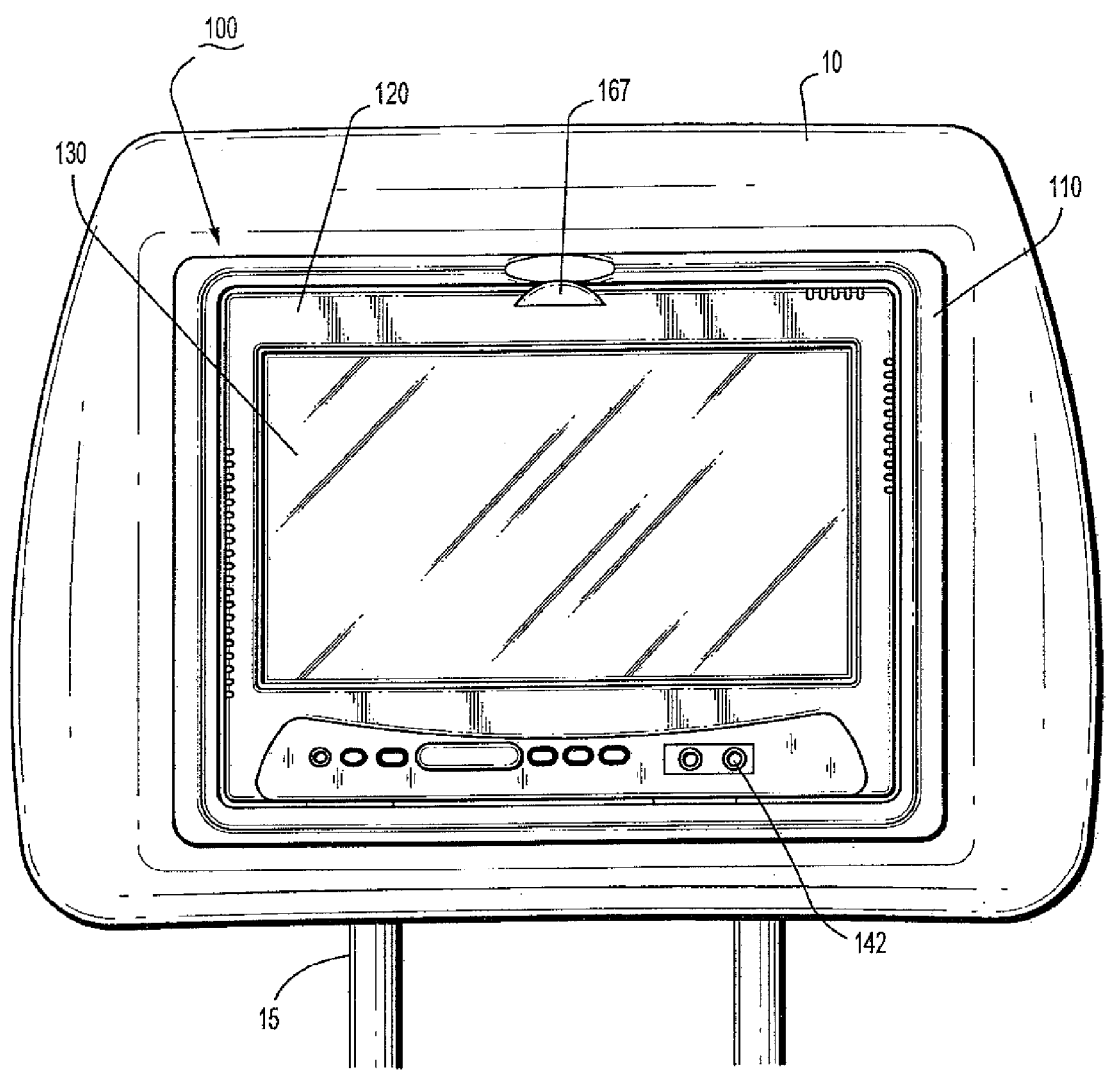
FIG. 1A shows a front view of a portable entertainment system including a media unit coupled to a housing mounted in a headrest, according to an embodiment of the present invention.
Figure 11:
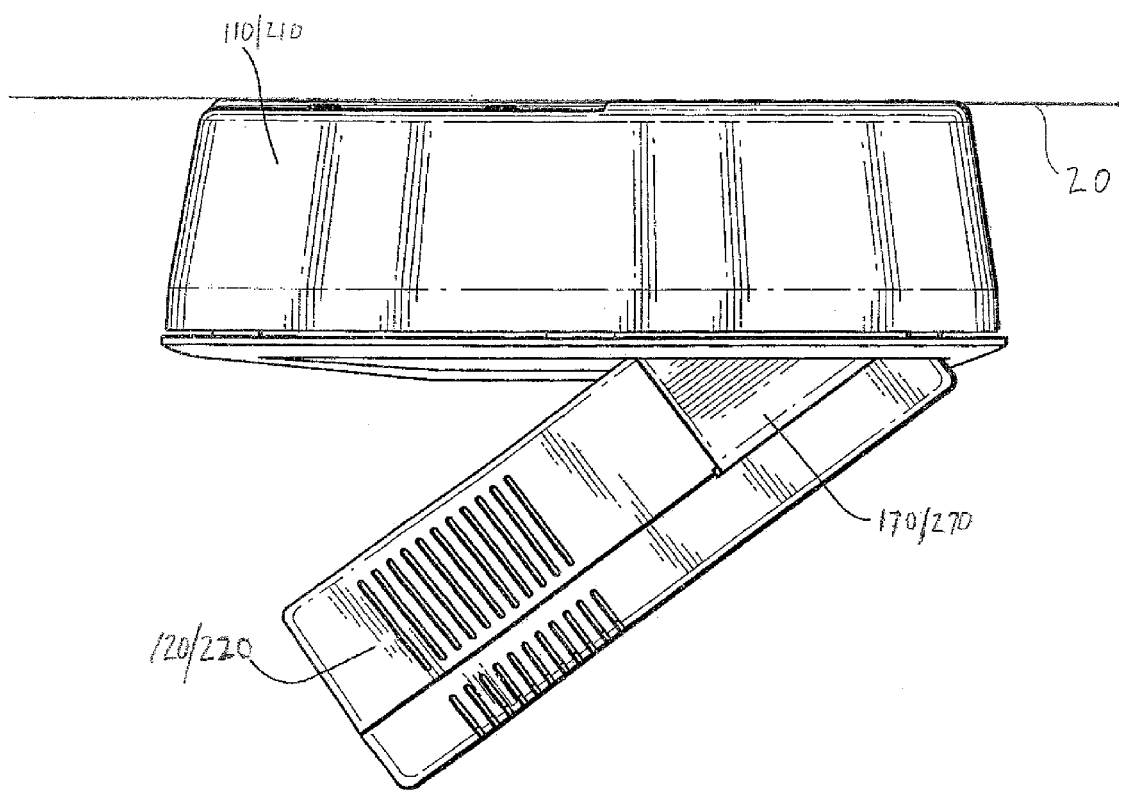
FIG. 11 shows a left side view of the portable entertainment system including the media unit in a pivoted position with respect to the housing mounted to an overhead portion of the vehicle, according to an embodiment of the present invention.

Referring to FIGS. 1A and 1B, a headrest 10 includes an entertainment system 100 mounted therein. The entertainment system 100 includes a housing 110 and a media unit 120, which is easily coupled to and removed from the housing 110. The media unit 120 includes a display 130 having a screen for displaying video. The screen is preferably an LCD type display, but may be another type of display, such as, for example, an organic LED, a plasma display or electro-luminescent display. Referring to FIGS. 11 and 12, according to an alternative embodiment, the entertainment system and housing 110/210 may be mounted in and/or to an overhead portion of the vehicle, such as a ceiling 20.

In one embodiment, an LCD simultaneously displays different content in right and left viewing directions by directionally controlling the viewing angle of the LCD. In other words, one passenger can see a program from a first media source from a right side of the display, while another can see a program from a second media source from the left side of the display. The simultaneous display of different content on the display (e.g., display 130), is accomplished by superimposing a parallax barrier on a thin film transistor (TFT) LCD to enable light from a backlight to separate into right and left directions.

Figure 4A:
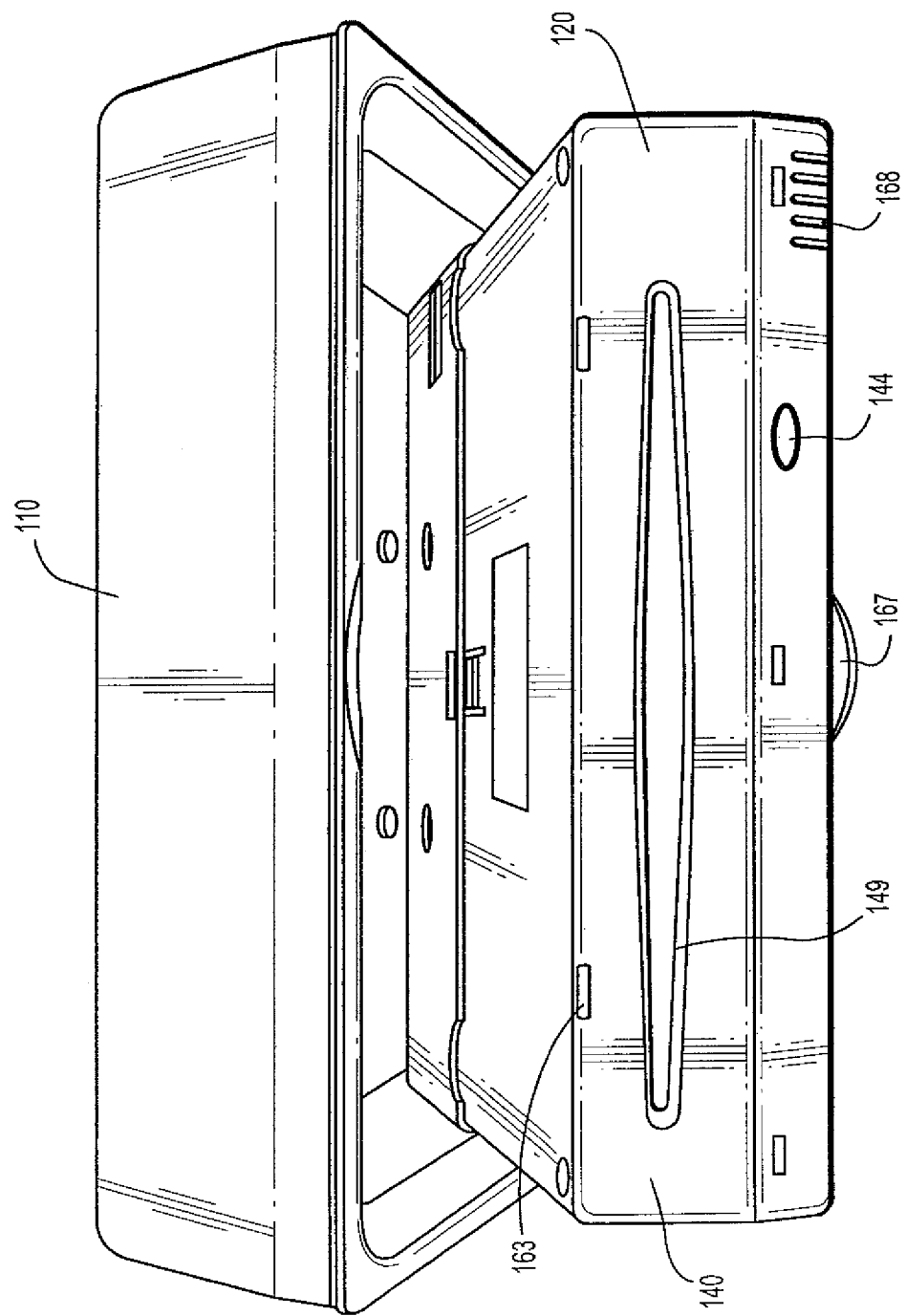
FIG. 4A shows a top perspective view of the portable entertainment system including the media unit in a pivoted position with respect to the housing, according to an embodiment of the present invention.
Figure 4D:
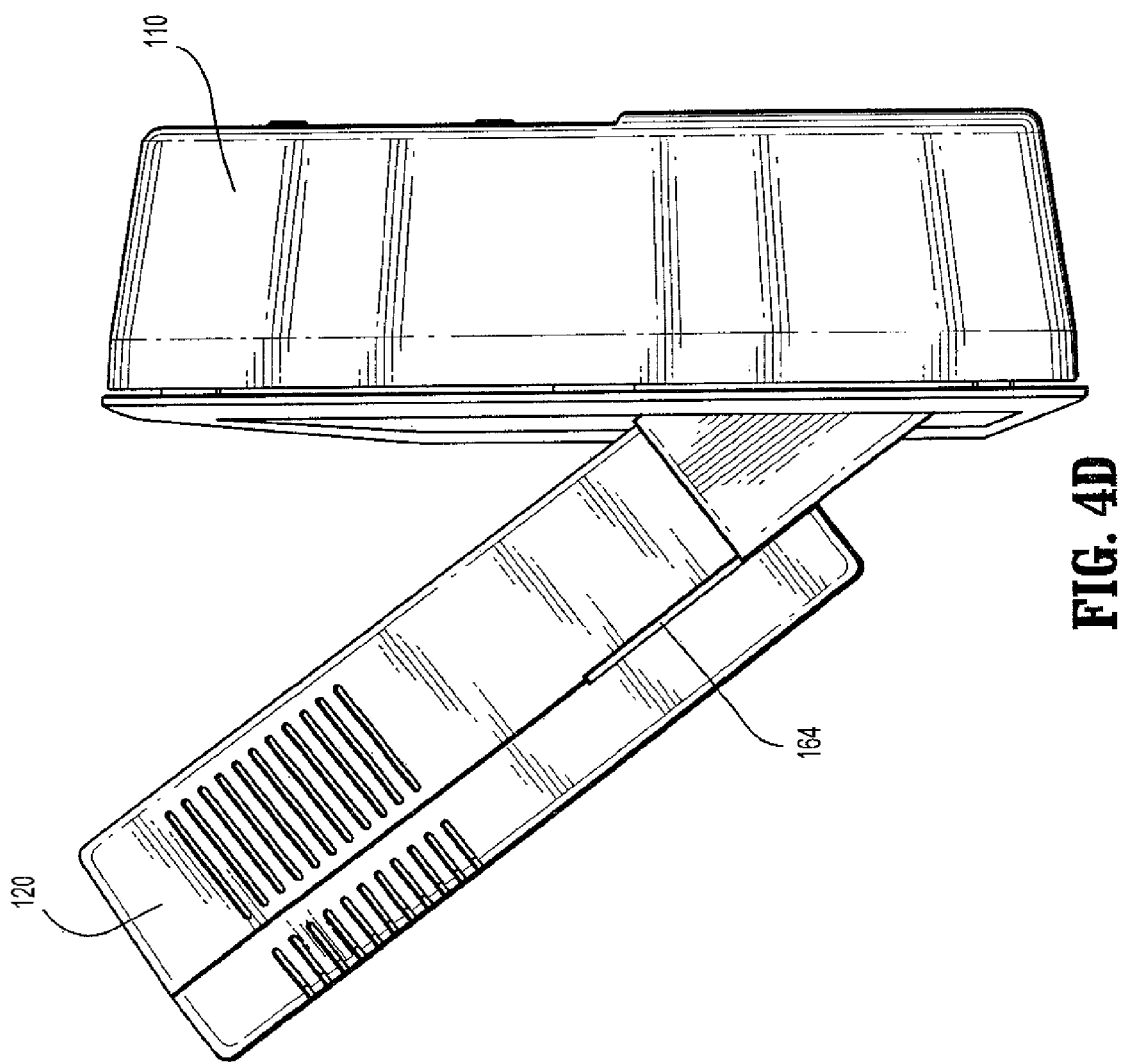
FIG. 4D shows a left side view of the portable entertainment system including the media unit being coupled to or removed from the housing via the hinge structure, according to an embodiment of the present invention.
Figure 4E:
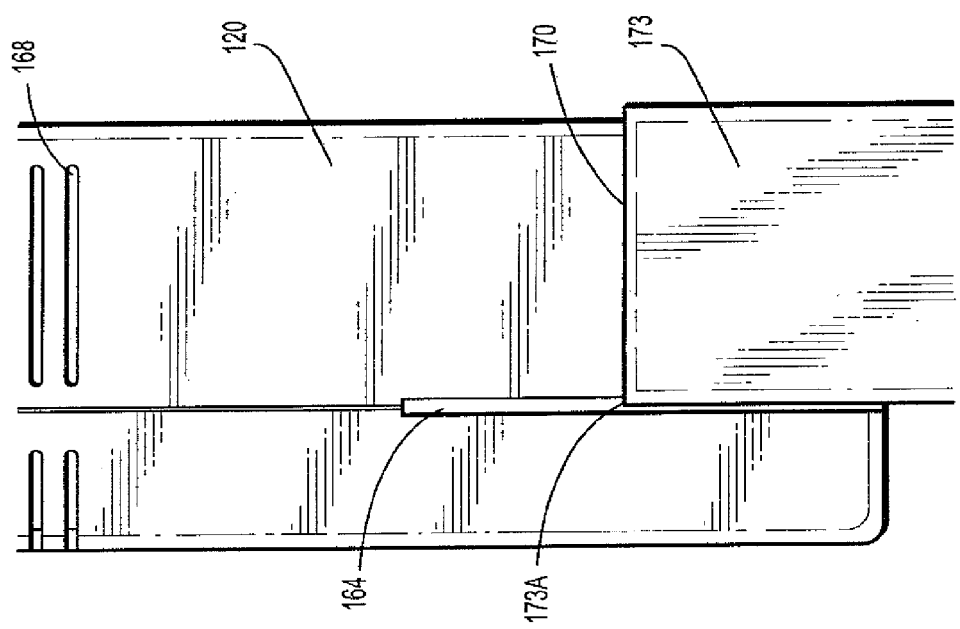
FIG. 4E shows a close-up left side view of the media unit engaged with the hinge structure, according to an embodiment of the present invention.

Video is supplied from a media source, for example, a DVD player 140 provided behind the display 130 (see FIG. 4A). The media source may also be, for example, a CD-ROM player, a video game player, a videocassette player, a television tuner, a radio tuner, a wireless receiver, an MP3 player, a digital video recorder, a device for playing media supplied from a portable storage device (e.g., a portable hard drive, memory cards, flash memory sticks, key drives, thumb drives), and/or a device for playing media supplied from a portable audio or video player, such as, for example, an IPOD®. The media unit 120 may include a memory device, for example, a DVR, which receives and stores video programming, and hardware for playing such programming. Alternatively, the display 130 can be electrically connected to an auxiliary media source through auxiliary port 142.

Figure 2B:
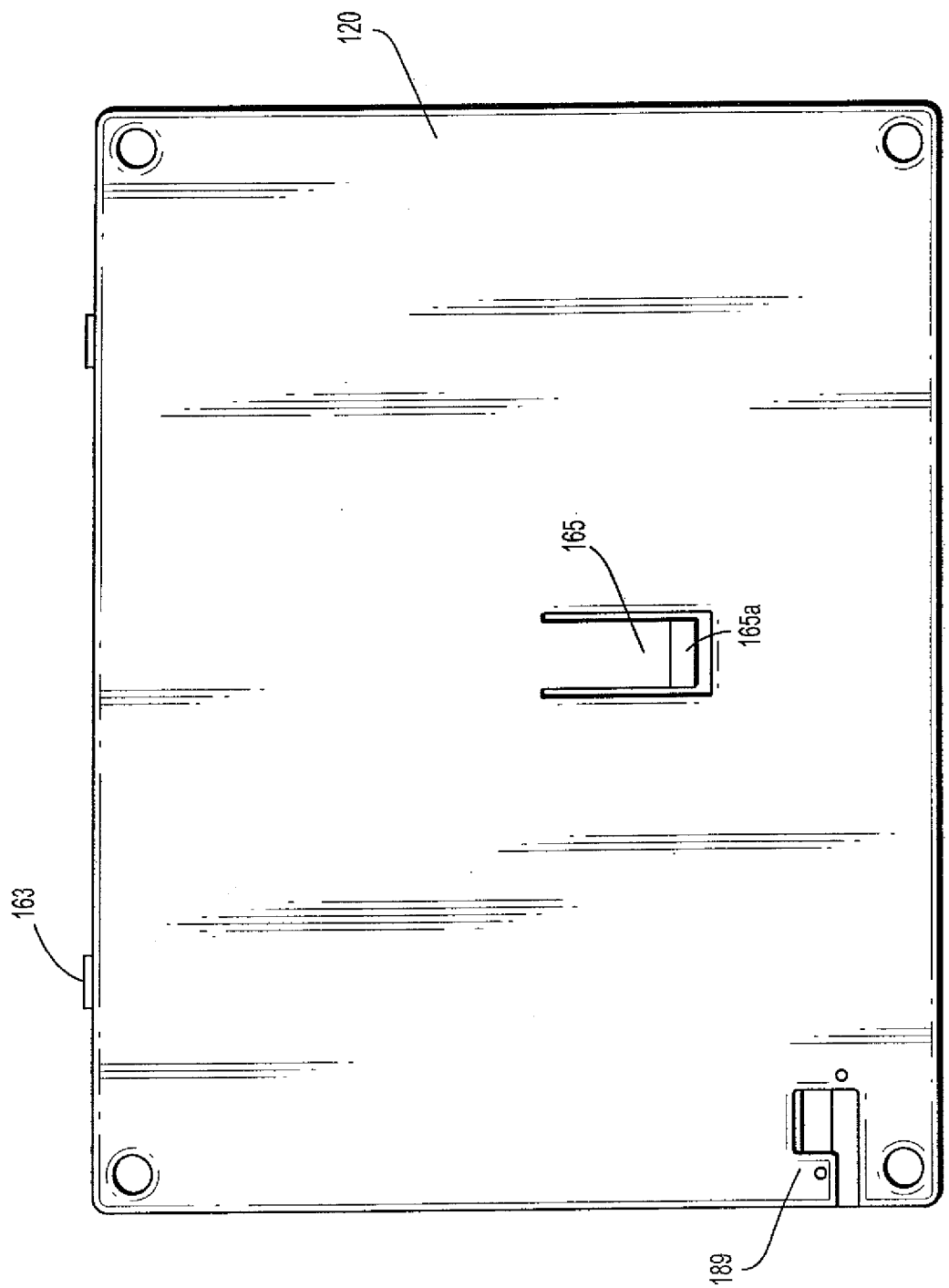
FIG. 2B shows a rear view of the media unit removed from the housing, according to an embodiment of the present invention.
Figure 2D:
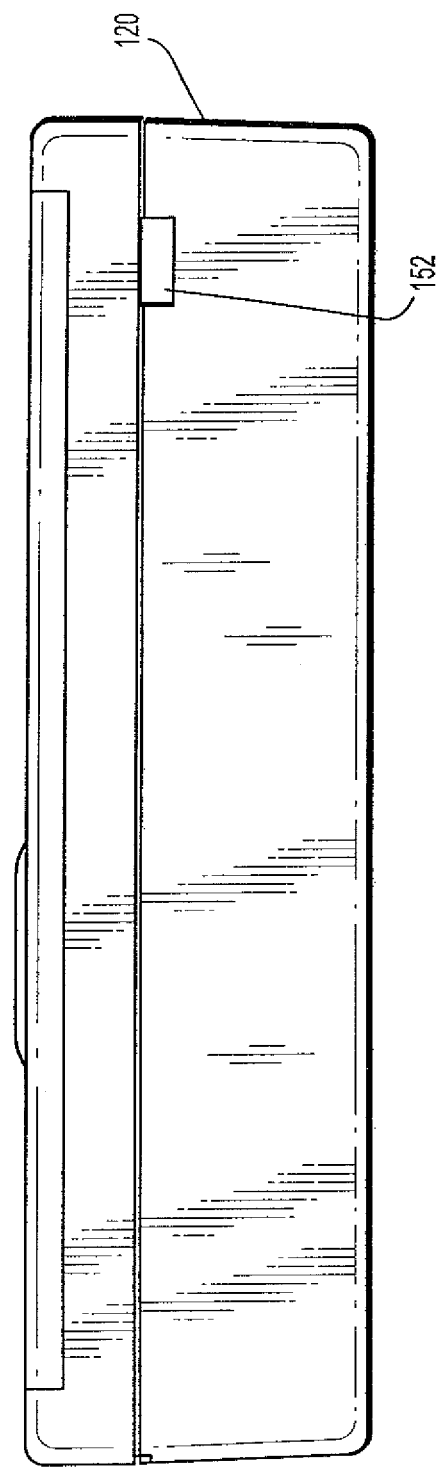
FIG. 2D shows a bottom view of the media unit removed from the housing, according to an embodiment of the present invention.
Figure 3A:
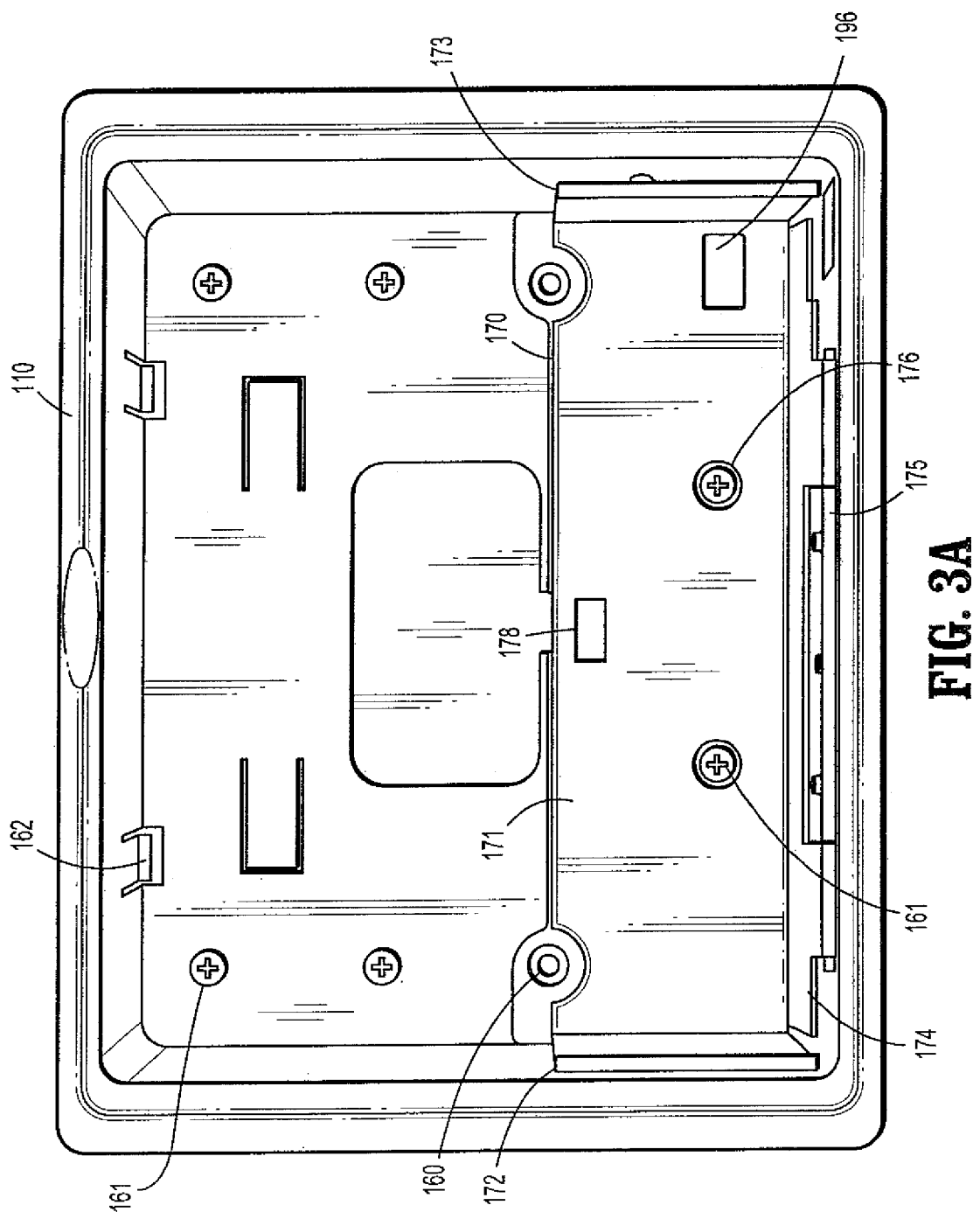
FIG. 3A shows a front view of the housing with a hinge structure in a retracted position, according to an embodiment of the present invention.
Figure 3B:
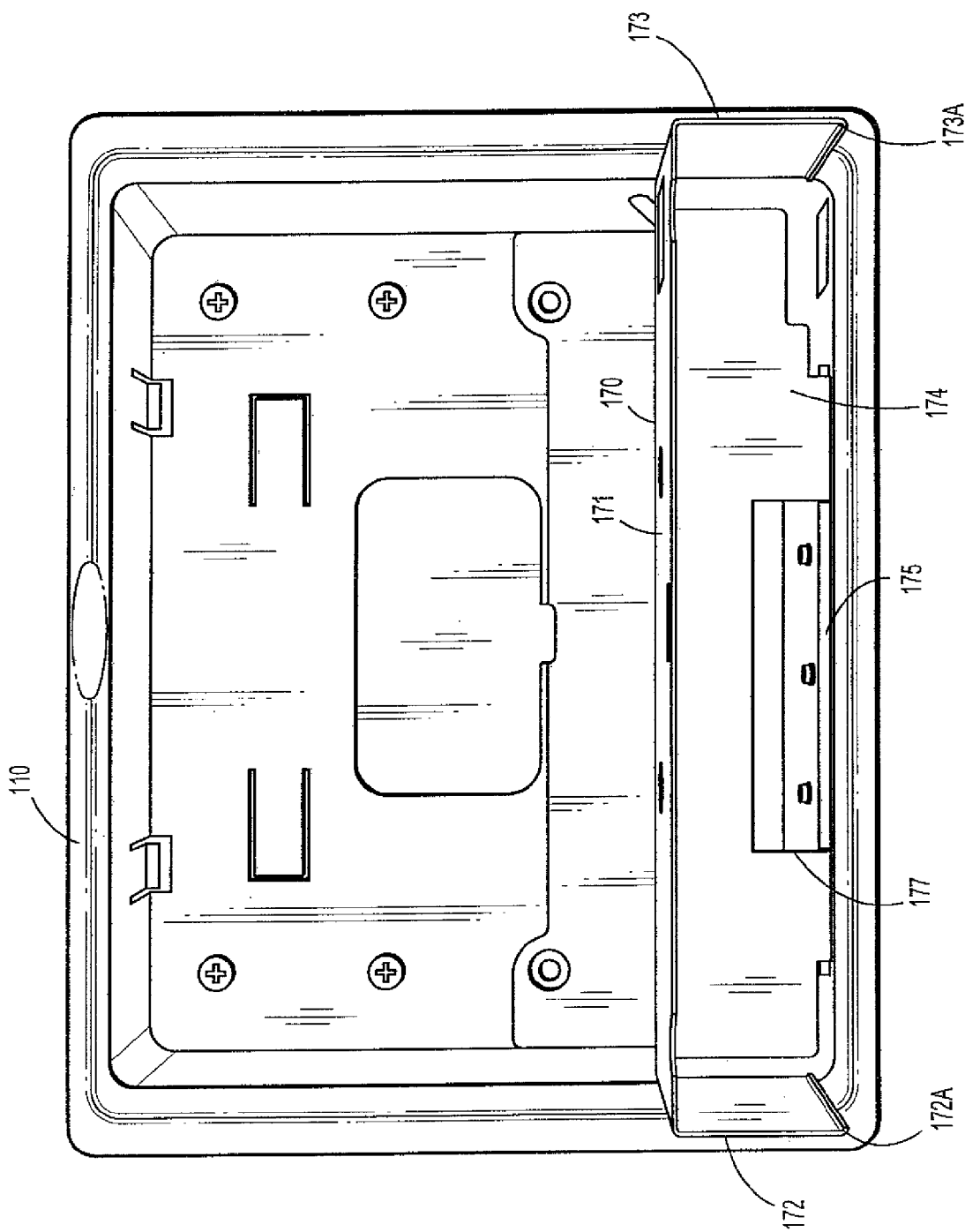
FIG. 3B shows a front view of the housing with the hinge structure in a pivoted position, according to an embodiment of the present invention.
Figure 3C:
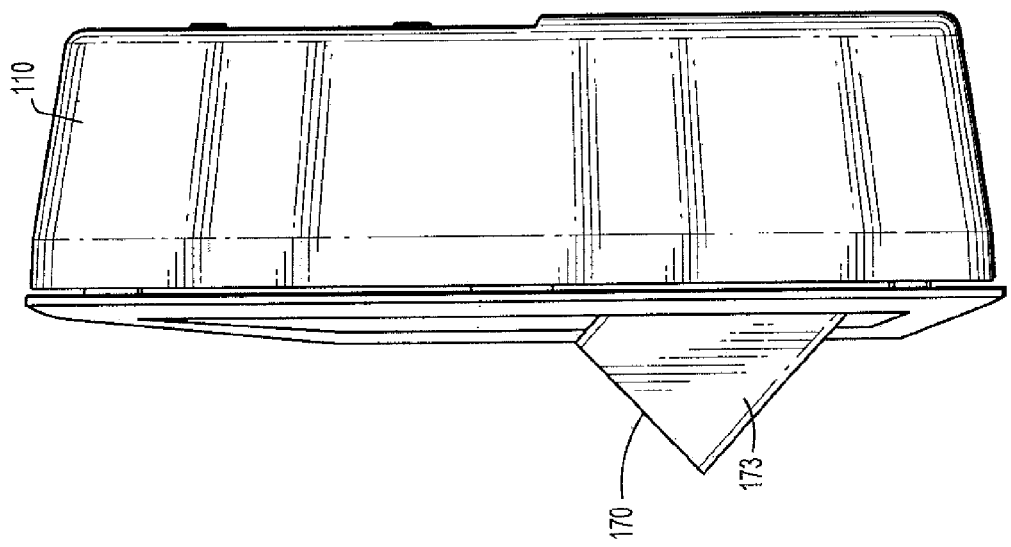
FIGS. 3C-3D show left side views of the housing with the hinge structure in a pivoted position, according to an embodiment of the present invention.
Figure 3D:
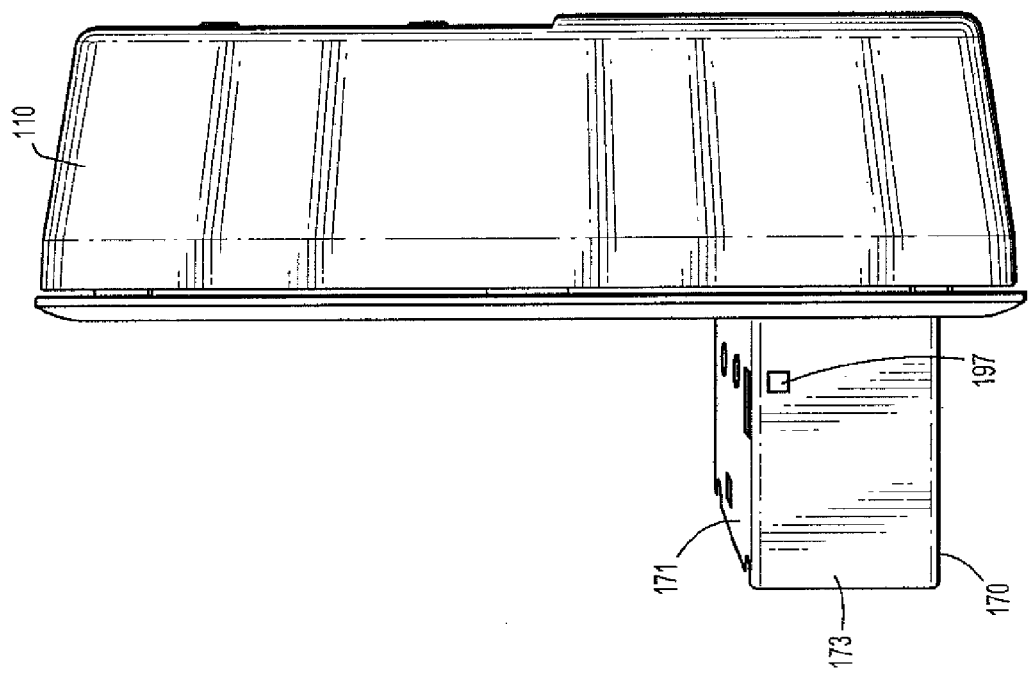
Figure 3E:
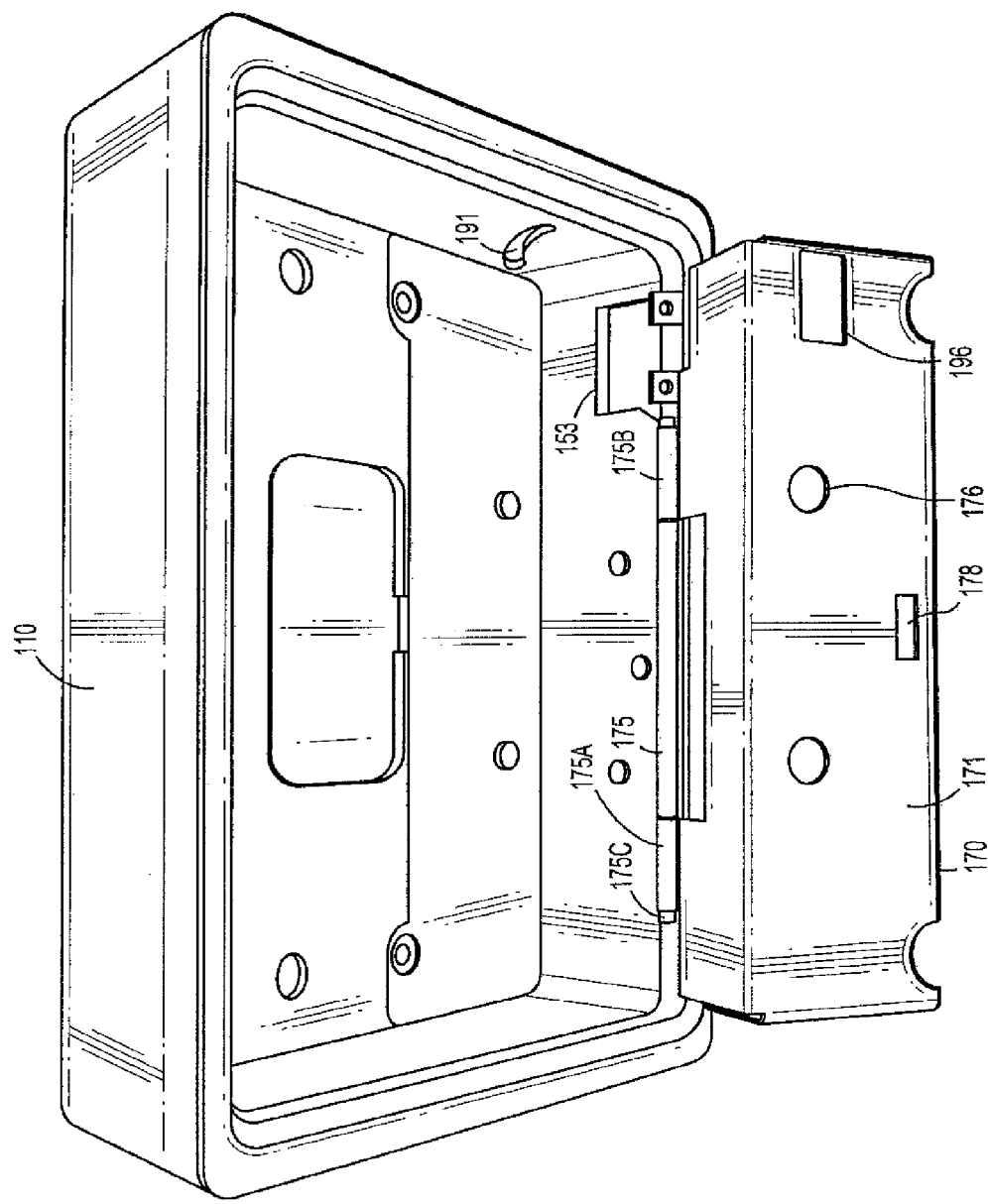
FIG. 3E shows a perspective view of the housing with the hinge structure in a pivoted position, according to an embodiment of the present invention.
Figure 3F:
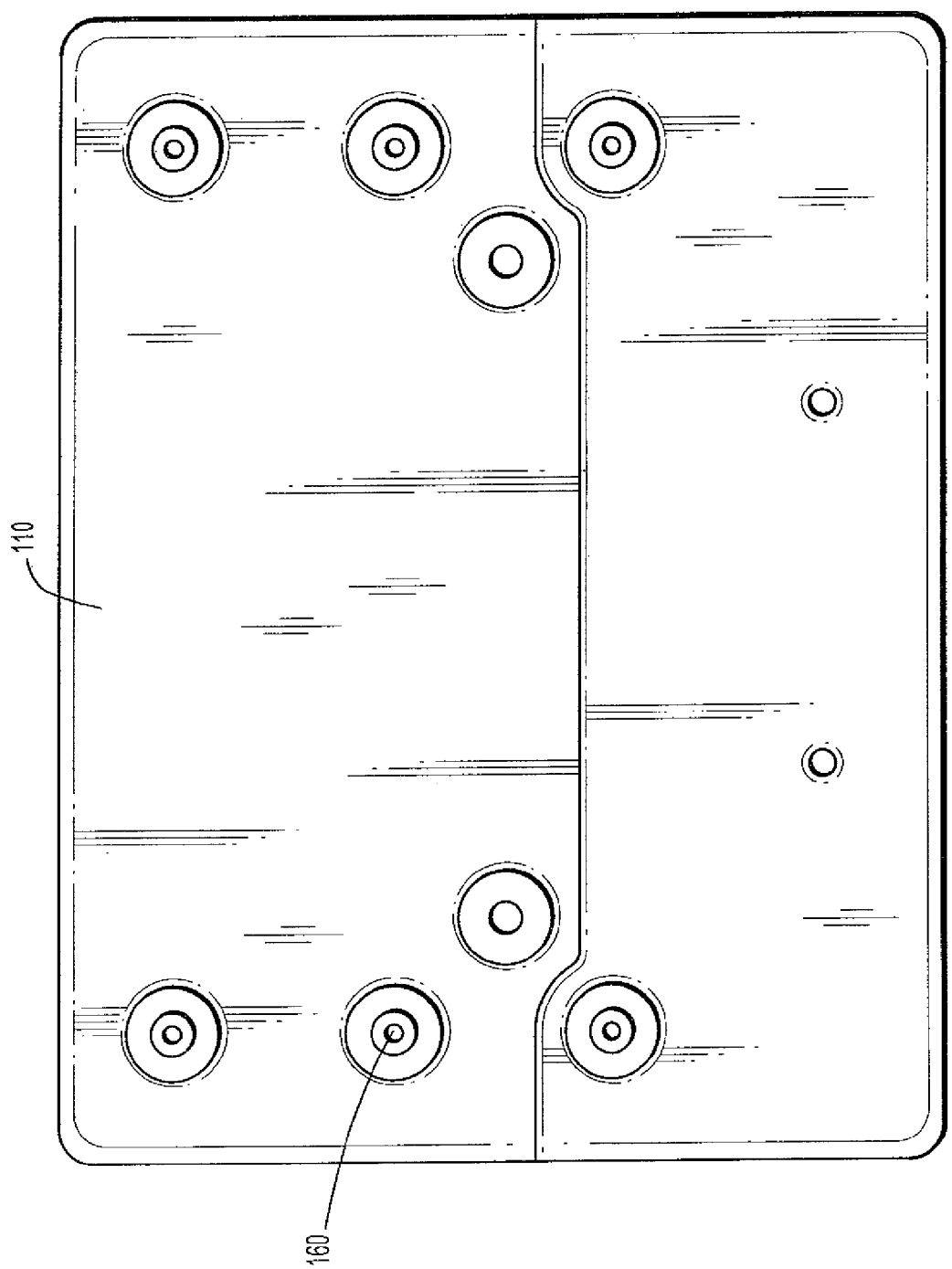
FIG. 3F shows a rear view of the housing, according to an embodiment of the present invention.
Figure 3G:
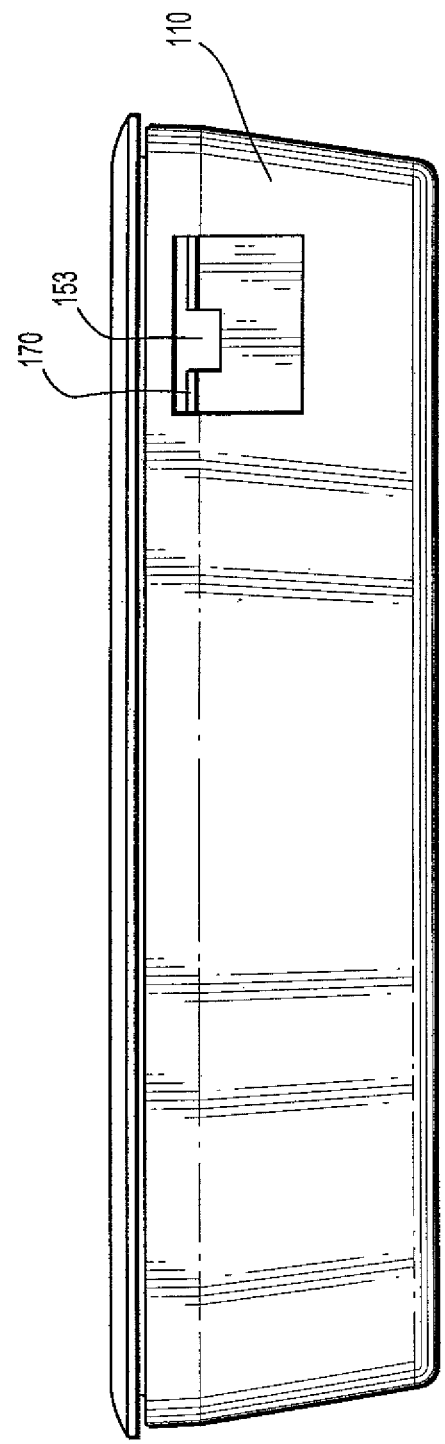
FIG. 3G shows a bottom view of the housing, according to an embodiment of the present invention.
Figure 5B:
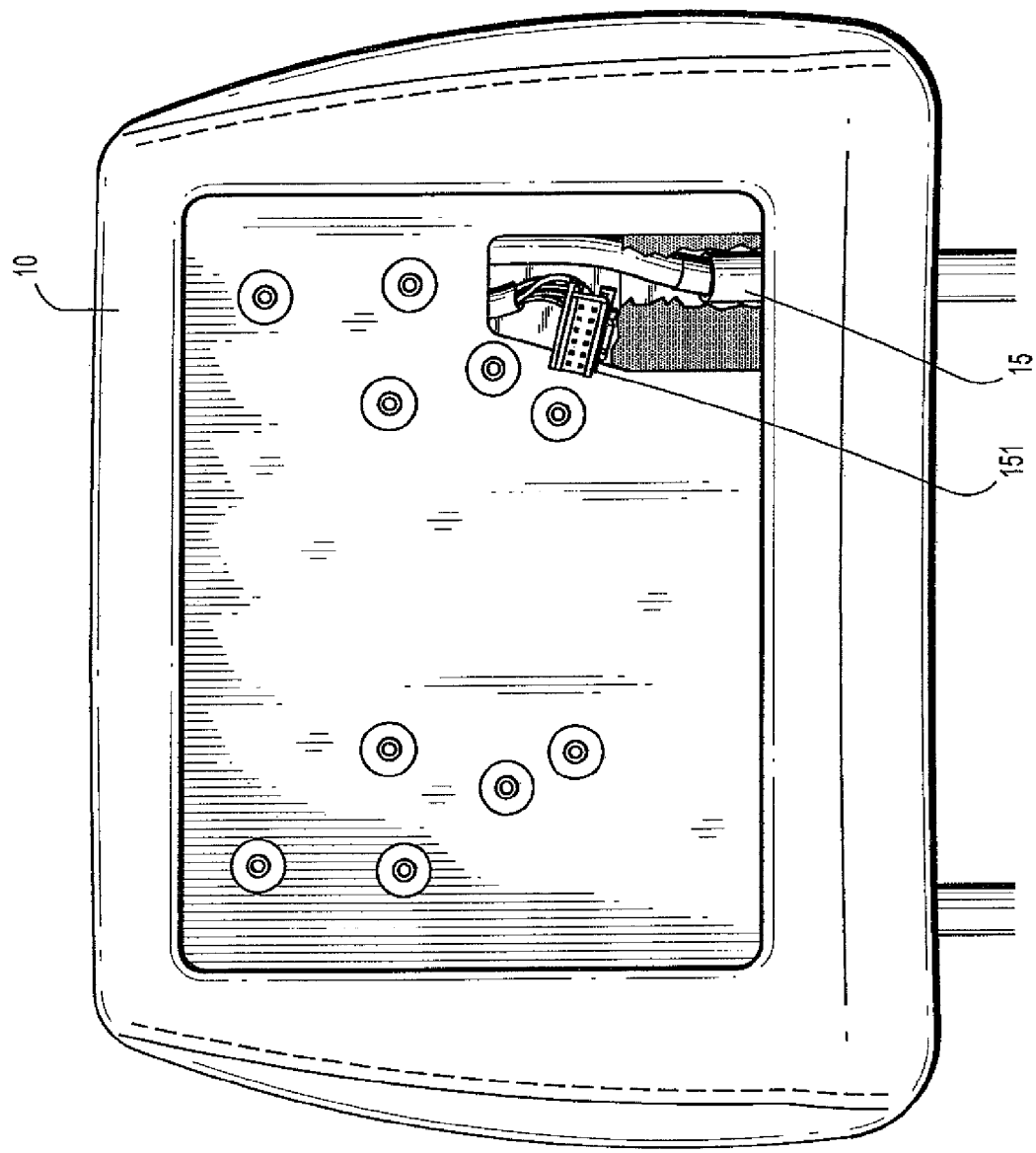
FIG. 5B shows a front view of a headrest including a wired connection, according to an embodiment of the present invention.
Figure 5C:
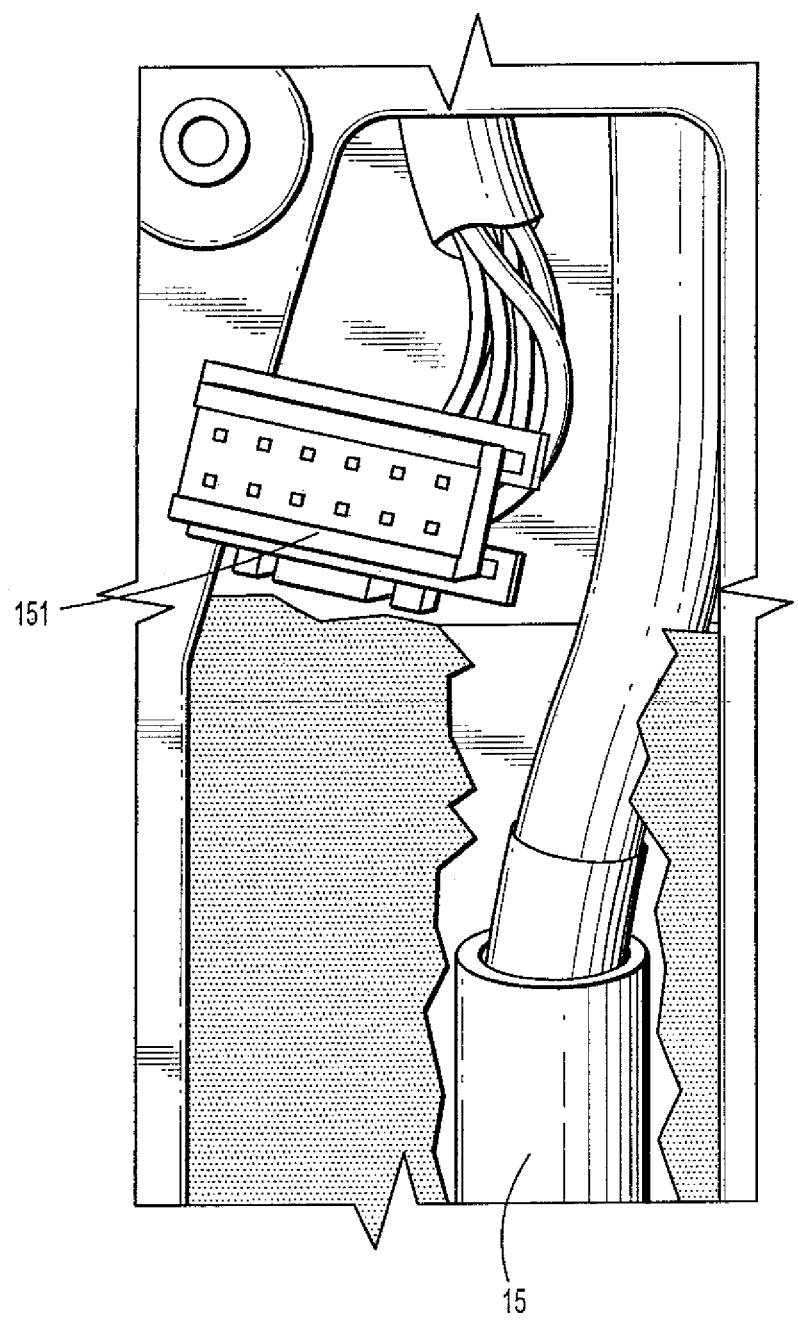
FIG. 5C shows a close-up view of the wired connection shown in FIG. 5B.

In another alternative, the display 130 is electrically connected to a media source, for example, another DVD player in another headrest or a media source located elsewhere in the vehicle, such as under a seat, via a wired connection 150 running from the media unit 120. Referring to FIGS. 5A-5C, the wired connection 150 running from the media unit 120 preferably includes electrical connectors, for example, pin connectors, for connecting to mating pin connectors 151 positioned in the headrest 10, which are, in turn, connected to wire leads running through the headrest support rods 15 to connect to a wire harness or distribution box (not shown). By unplugging the pin connectors from each other, a user is able to remove the media unit 120 from the housing 110 without cutting or pulling apart the wires. Referring to FIGS. 2D, 3E and 3G, the media unit 120 and the housing 110 each include openings 152, 153 through which wires can be fed.

The wired connection 150 preferably carries, for example, power, ground, and audio/video inputs and outputs. For example, video from DVD player 140 may be supplied via wired connection 150 to a display located in another headrest of the vehicle. The connection 150 may also carry control signals for a wireless FM modulator for supplying wireless audio to a vehicle sound system or to wireless headphones.

Referring to FIGS. 1A, 1B and 2A, the front face of the media unit 120 includes a plurality of control buttons, for example, a power button 141, a screen mode button 143 for controlling aspect ratio, play and stop buttons 145 for controlling play of a video program and a source button 147 for controlling the source of a program (e.g., DVD or auxiliary input). Depending on the selected sources for each media unit, multiple displays in multiple headrests may simultaneously play the same or different programs. The media unit 120 also includes an infrared transmitter and receiver 146 for transmitting, for example, wireless audio signals to wireless headphones, and for receiving remote control signals. A headphone jack 148 is also positioned on the front face of the media unit 120.

The media unit 120 includes slits 168 formed in the body thereof, creating openings to facilitate ventilation and the passage of sound from, for example, a speaker (not shown) provided in the body of the media unit 120.

The media unit 120 can be operated when the media unit 120 is not positioned in the housing 110. The media unit 120 may receive power by connecting to a specialized battery or battery pack, household batteries and/or an AC/DC adapter. The connection between the battery pack and the media unit 120 may be provided through any appropriate electrical contacts, for example, contacts for connecting to Lithium or NiCad batteries. The media unit 120 can connect to an AC/DC adapter via an AC/DC adapter port. Alternatively, a battery housing in the media unit 120 can be used to receive household batteries or compact battery packs.

Referring to FIGS. 3A-3G, the housing 110 includes a plurality of recesses 160 for receiving fixing devices, such as screws 161 for mounting the housing 110 to a rigid portion of the headrest 10 (see FIG. 5B). The housing 110 also includes a plurality of flexible members 162, which flex upward by pressure from tabs 163 (see FIGS. 2A, 4A-4B) when the media unit 120 is pivoted into the housing 110. Once the tabs 163 pass the flexible members 162, the flexible members flex back downward to hold the media unit 120 in place. When the media unit 120 is pivoted out of the housing (see, e.g., FIGS. 4A-4C), the members 162 flex back upward similar to when the media unit 120 is pivoted into the housing 110 to allow the media unit 120 to freely rotate.

The housing 110 includes a hinge structure 170, which pivots the media unit 120 with respect to the housing 110. In addition, the hinge structure 170 receives and provides support for the media unit 120 so as to couple the media unit 120 to the housing 110. The hinge structure 170 is formed in a U-shape, having a rear side 171, right and left sides 172, 173 and a bottom side 174. The hinge structure 170 is coupled to the housing 110 via a hinge 175. The hinge structure 170 includes openings 176, 177 on the rear and bottom sides 171, 174 thereof to provide access to fixing devices, such as, screws 161. The hinge structure 170 is made from metal, such as, for example, aluminum, cast iron or stainless steel, but may also be made from, for example, plastic or rubber.

Referring to FIGS. 4A-4E, the media unit 120 is positioned in the hinge structure 170 to rest on the bottom side 174, such that the rear, right and left sides 171-173 partially surround rear, right and left sides of the media unit 120. As shown in FIGS. 2C, 3B and 4C-4E, the right and left sides 172, 173 of the hinge structure 170 include inward folds 172a and 173a, which engage grooves 164 formed on right and left sides of the media unit 120. The engagement of the grooves 164 with the folds 172a, 173a secures the media unit 120 in the hinge structure 170. In addition, the media unit 120 includes a flexible member 165 on its rear side that fits into an opening 178 on the rear side of the hinge structure 170 to further secure the media unit 120 to the hinge structure 170. The flexible member 165 flexes toward the inside of the media unit 120 when the media unit 120 is being positioned in the hinge structure 170 and flexes back out through opening 178 when the media unit 120 is in place. A lip portion 165a of the flexible member 165 passes through the opening 178 to keep the media unit 120 in place.

As can be seen in FIGS. 11 and 12, when the housing 110 or 210 is mounted to and/or in the ceiling 20 or other appropriate surface of a vehicle, the hinge structure 170 or 270 is pivoted with respect to the housing 110 or 210 to allow a user to position the media unit 120 or 220 in the hinge structure 170 or 270. Depending on the size of the media unit 120 or 220, the size of the hinge structure 170 or 270 can be made larger or smaller to snugly accommodate the media unit 120 or 220 therein.

According to an embodiment, media from the media unit 120 or 220 may be played on a display of the media unit 120 or 220, or a different display electrically connected to the media unit.

Referring to FIG. 3E, the hinge 175 includes two loops 175a and 175b, which rotate around a rod 175c. The hinge structure 170 rotates in the range of approximately 0° to approximately 135°. Alternative hinges known to those of ordinary skill in the art may be used and the angle range of rotation may be varied to be greater or smaller depending on design preferences.

As shown in FIG. 4A, the media unit 120 can be pivoted outward with respect to the housing 110 to adjust a viewing angle of the display 130 and to provide access to a media source 140 to insert or remove a media storage medium, such as, for example, a DVD. The media storage medium insertion point 149 and control buttons 144 for the media source 140 can be located on a top side of the media unit 120.

The media unit 120 includes a tab 167 that can be gripped by a user to pull the media unit 120 out from a secured position in the housing 110. The tab 167 is positioned at a top center portion of the front face of the media unit 120.

Figure 6A:
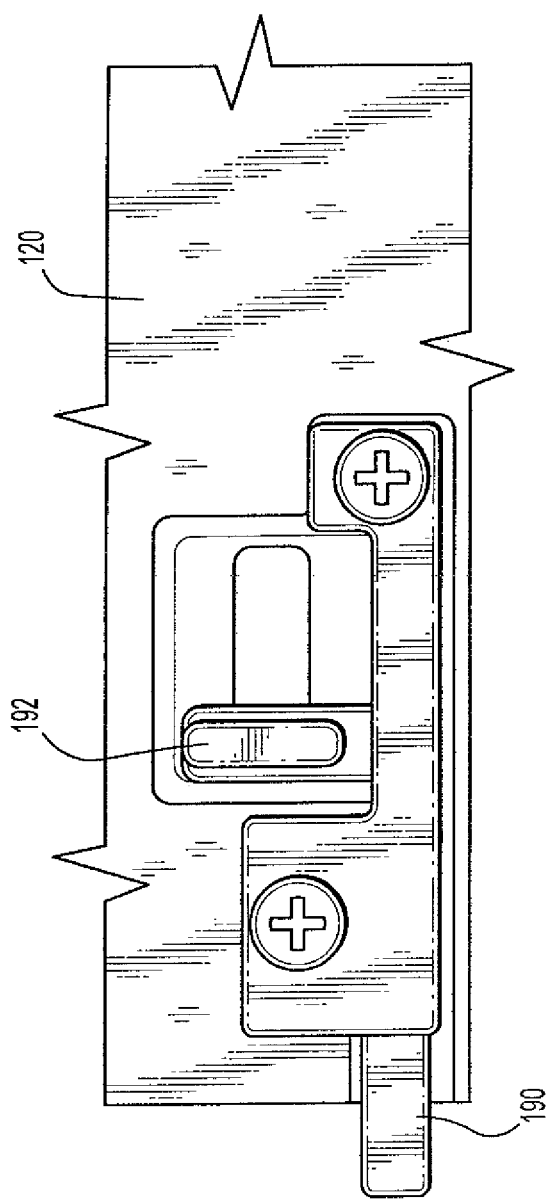
FIG. 6A shows a close-up view of a tab for restricting pivoting of the media unit with respect to the housing in the extended position, according to an embodiment of the present invention.
Figure 6B:
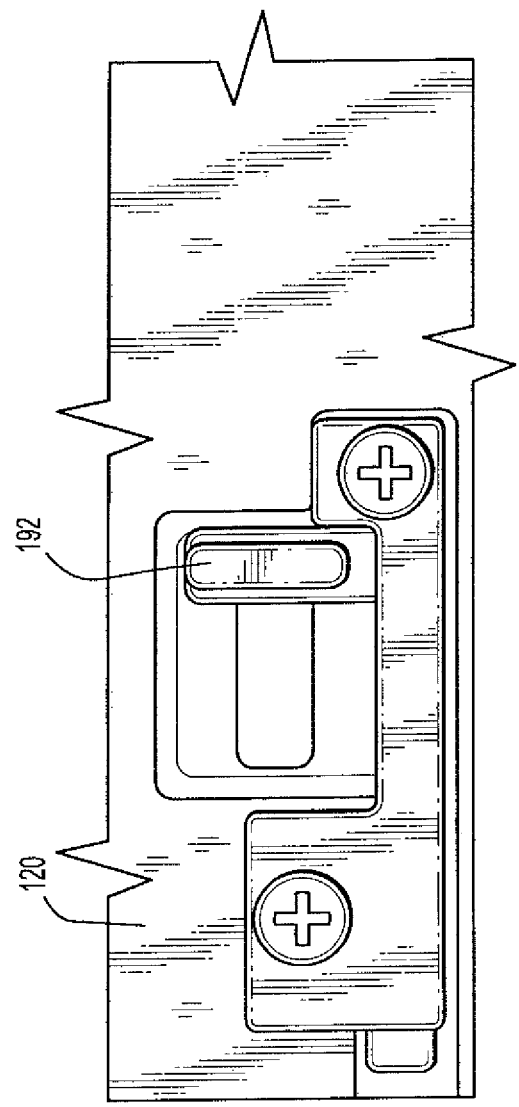
FIG. 6B shows a close-up view of the tab of FIG. 6A in the retracted position, according to an embodiment of the present invention.

Referring to FIGS. 6A-6B (see also FIGS. 2B, 3A, 3D, 3E and 4B), the media unit 120 may include a tab 190 on a back side thereof at location 189 that can be extended to engage a curved slot/groove 191 formed in the housing 110. The groove 191 follows the rotation of the media unit 120 with respect to the housing 110 and engagement of the tab 190 with the groove 191 restricts an angle of rotation of media unit 120 in a range of approximately 0° to approximately 45°.

As shown in FIGS. 6A-6B, the tab 190 can be extended or retracted by sliding a handle 192 attached to the tab 190 in opposite lateral directions. When the tab 190 is in the retracted position as shown in FIG. 6B, the tab 190 is not engaged with the groove 191. As a result, the media unit 120 can be pivoted to angles greater than about 45°, to, for example, about 90° and about 135° with respect to the housing 110, as shown in FIG. 4B. As shown in FIGS. 3A, 3D, 3E and 4B, the hinge structure 170 includes an opening 196 to provide access to handle 192 and an opening 197 through which tab 190 can pass to reach groove 191.

Figure 7A:
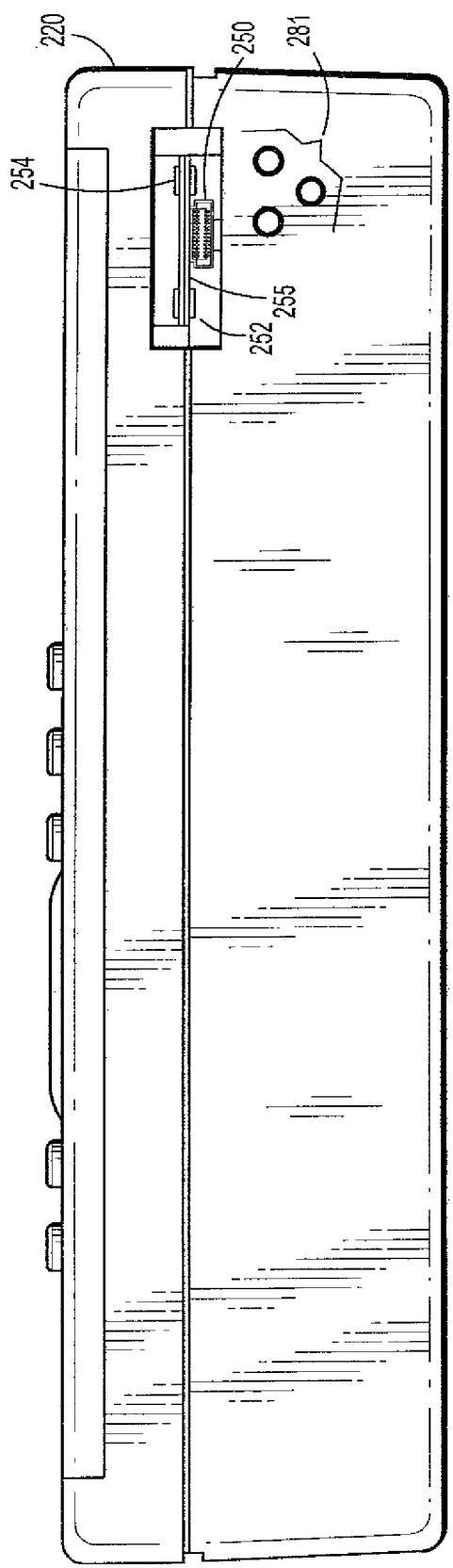
FIG. 7A shows a bottom view of a media unit removed from a housing, according to an embodiment of the present invention.
Figure 7B:
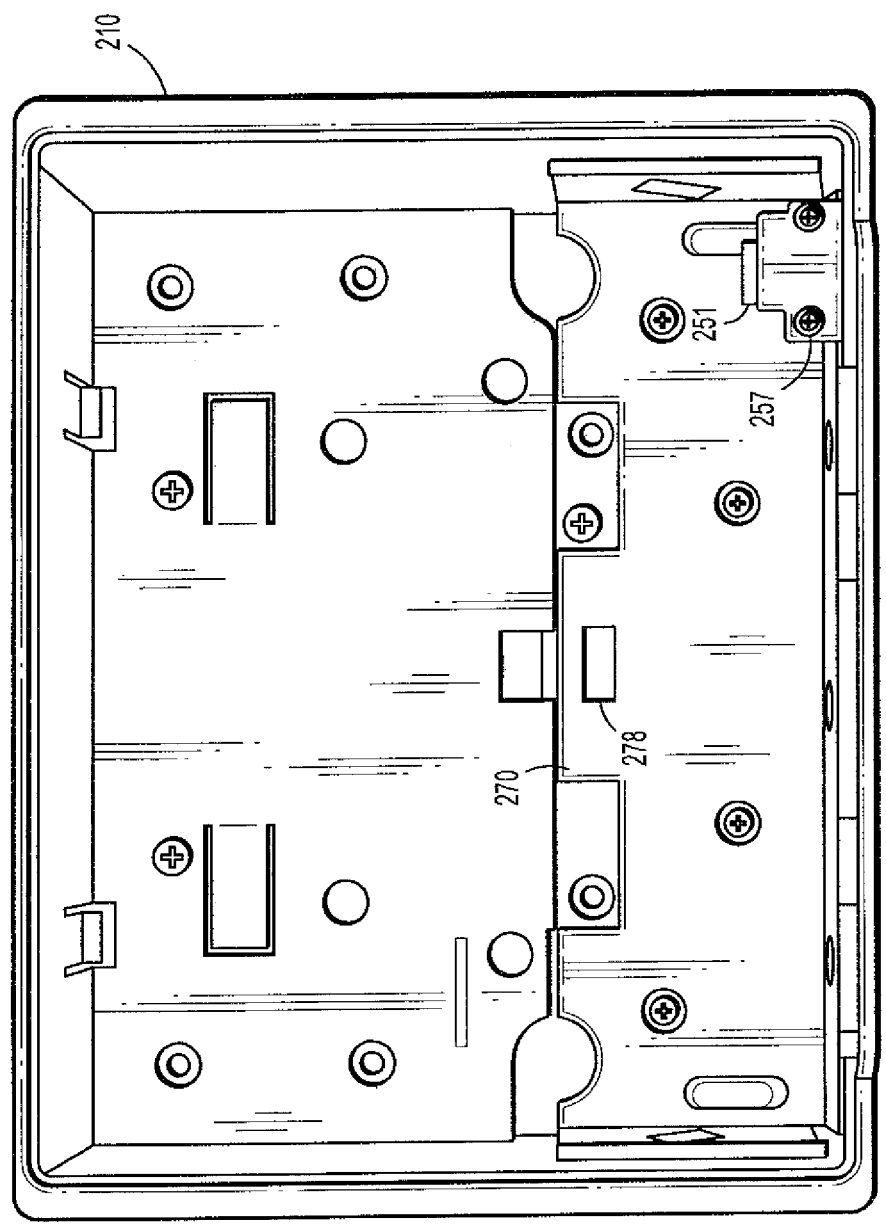
FIG. 7B shows a front view of a housing with a hinge structure in a retracted position, according to an embodiment of the present invention.

Referring to FIG. 7A, as an alternative to the connection 150 discussed in connection with FIGS. 5A-5C, a media unit 220, similar to the media unit 120, includes a connector 250 mounted therein. Like the connection 150, the connector 250 may be a pin connector or any other electrical connector used for transmission of signals, such as audio, video and power signals. An opening 252 provides access to the connector 250, and the connector 250 can be mounted in the media unit 220 by fixing the connector to a portion of a circuit board 255 and attaching the circuit board 255 to the media unit 220 using a fixing device(s) 254, such as, for example, a screw, bolt, or rivet.

Referring to FIGS. 7B-7F, a housing 210, similar to the housing 110, includes a connector 251 positioned on a circuit board 256. The circuit board 256 is mounted to a bottom side 274 of a hinge structure 270 of the housing 210. The hinge structure 270 is similar to the hinge structure 170.

The circuit board 256 may be mounted to the hinge structure 270 using a fixing device(s) 258, such as, for example, a screw, bolt or rivet, passing through a hole(s) 257 in the circuit board 256. The connector 251 is configured to mate with connector 250. Therefore, like the connector 250, the connector 251 may be a pin connector or any other electrical connector used for transmission of signals, such as audio, video and power signals. The connector 251 is configured to fit in the opening 252 of the media unit 220 and mate with the connector 250 when the media unit 220 is positioned in the hinge structure 270.

Figure 7C:
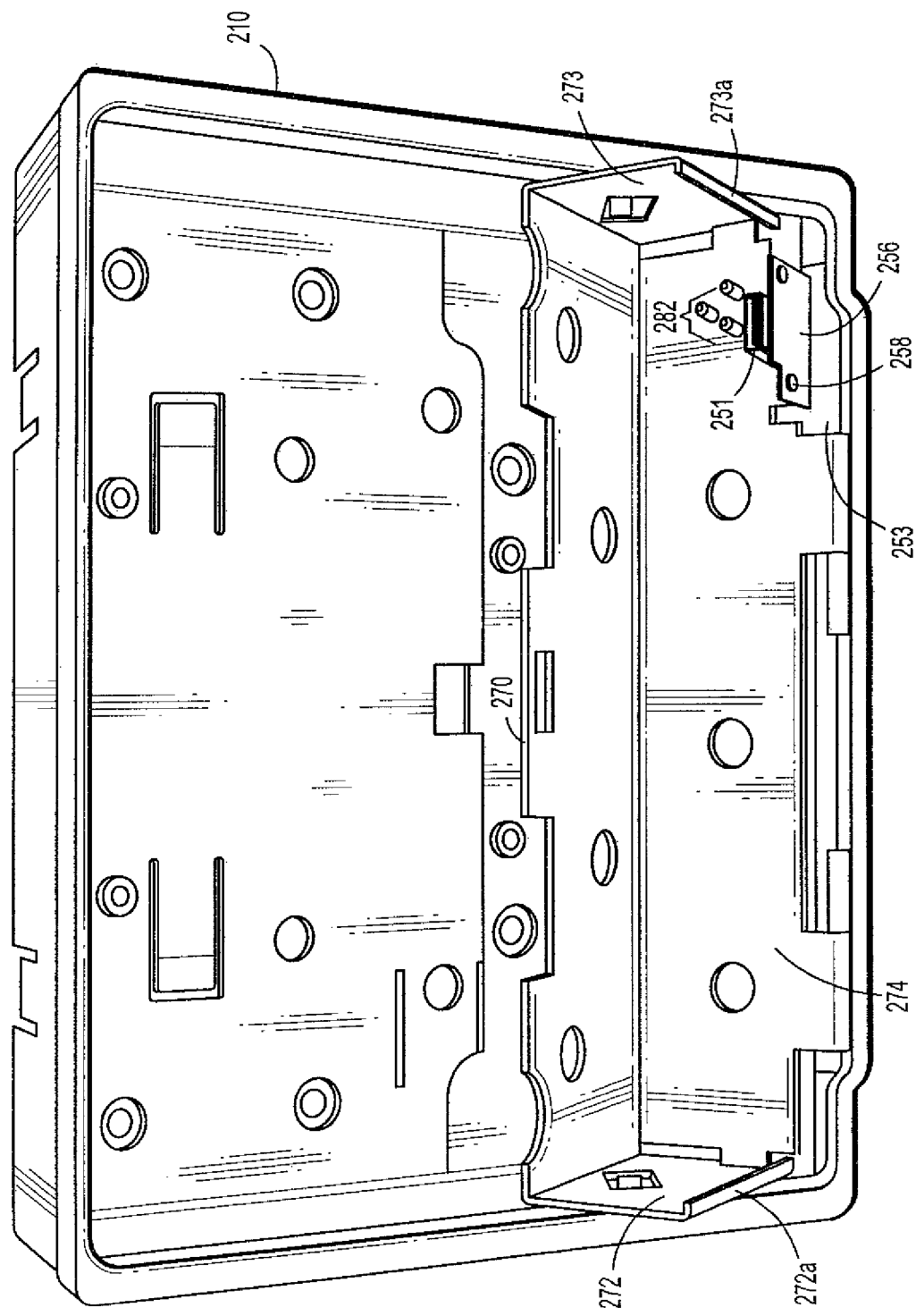
FIG. 7C shows a front view of a housing with a hinge structure in a pivoted position, according to an embodiment of the present invention.
Figure 7D:
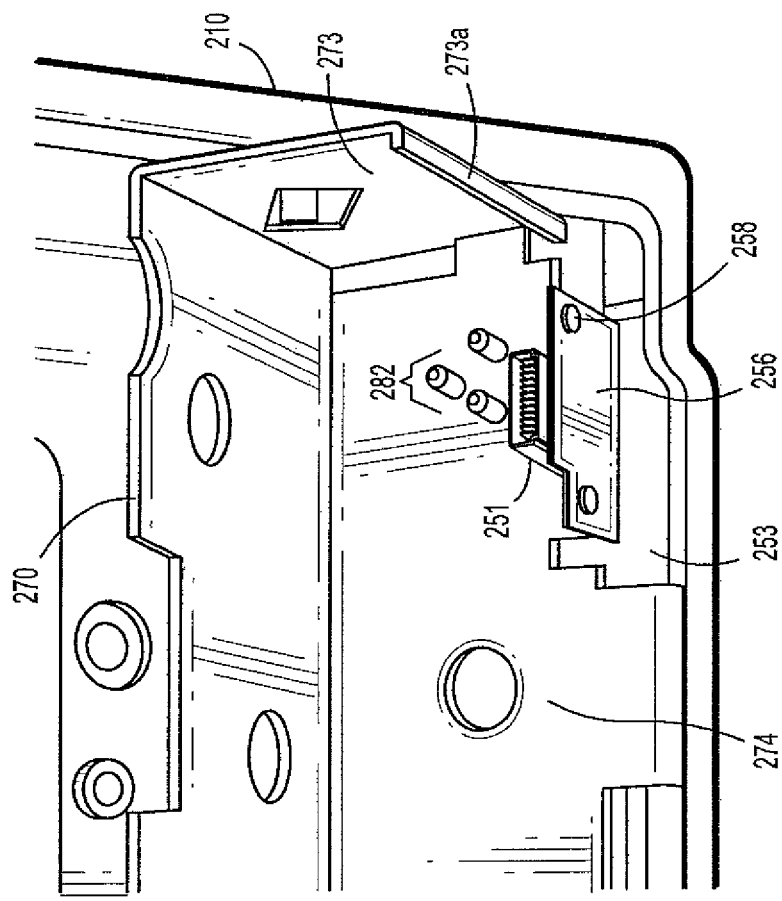
FIG. 7D shows a close-up view of the housing and hinge structure shown in FIG. 7C, according to an embodiment of the present invention.
Figure 7E:
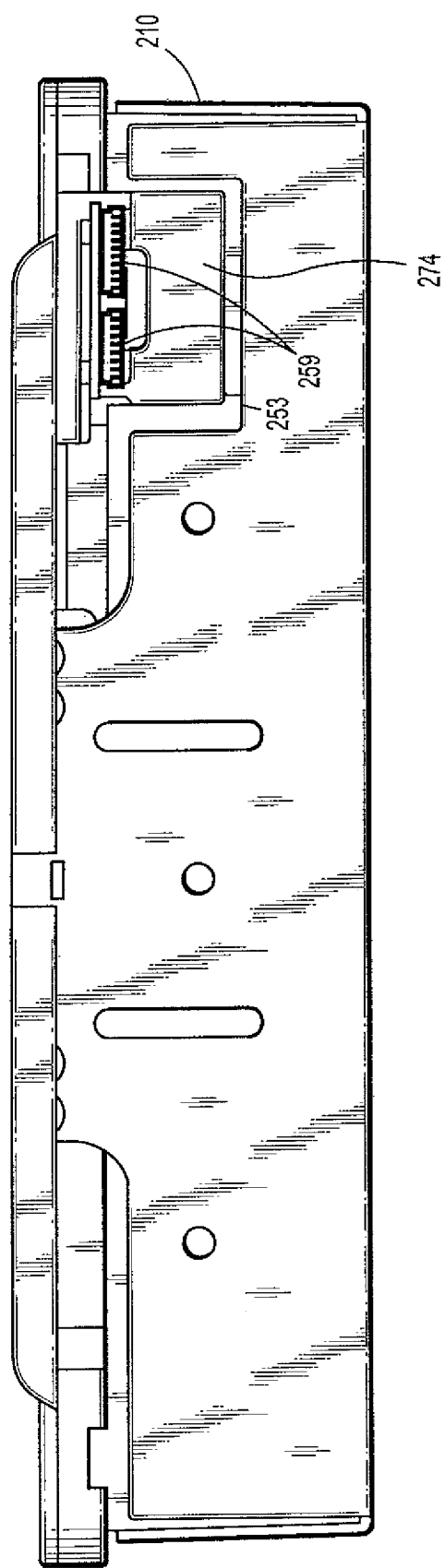
FIG. 7E shows a bottom view of a housing, according to an embodiment of the present invention.
Figure 7F:
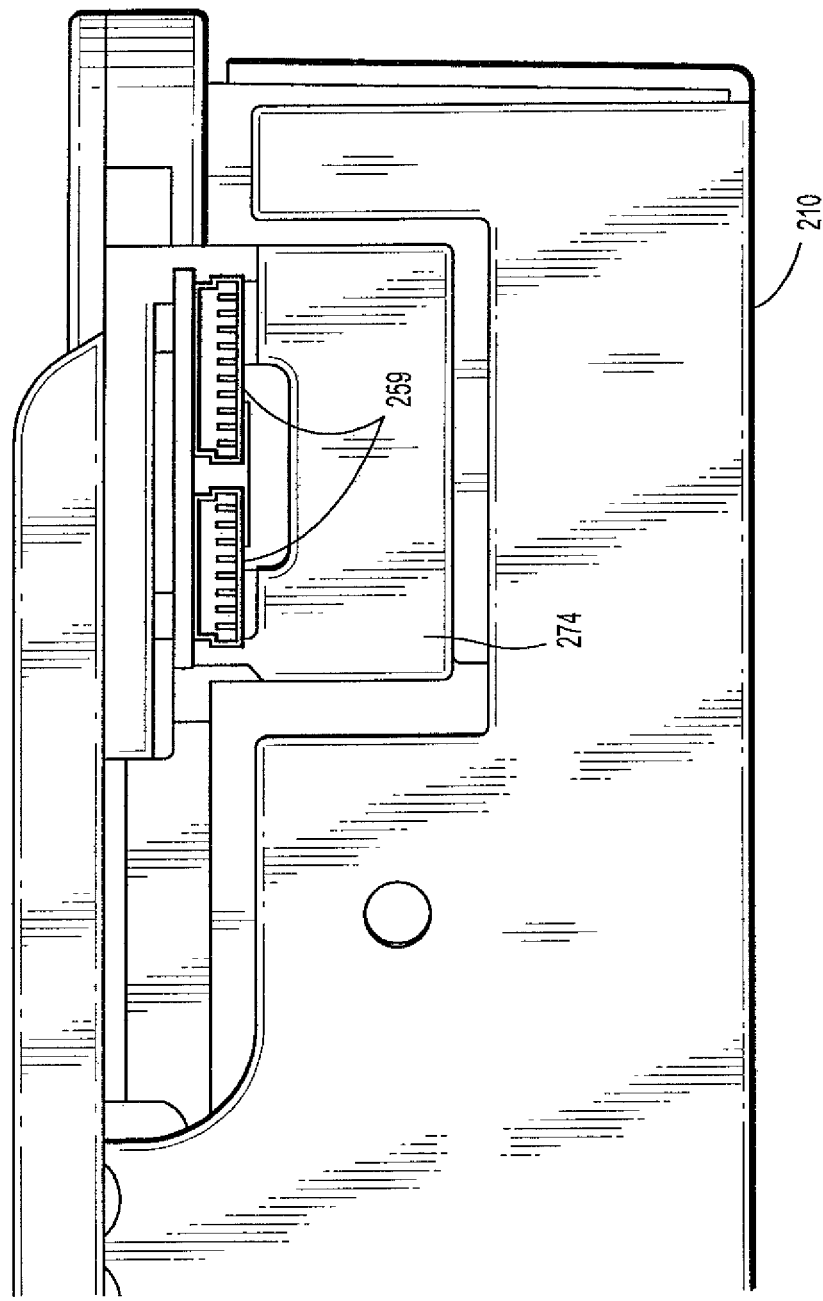
FIG. 7F shows a close-up view of the housing shown in FIG. 7E, according to an embodiment of the present invention.

Referring to FIGS. 7E and 7F, a connector or plurality of connectors 259 are positioned on the circuit board 256 at an end of the circuit board opposite the connector 251. The connectors 259 are electrically connected to the connector 251 via the circuit board 256. The connectors 259 are configured to connect to wire leads running through the headrest support rods 15 to connect to a wire harness or distribution box as described above. The bottom of the housing 210 includes an opening 253 through which the connectors 259 can be accessed.

Figure 8A:
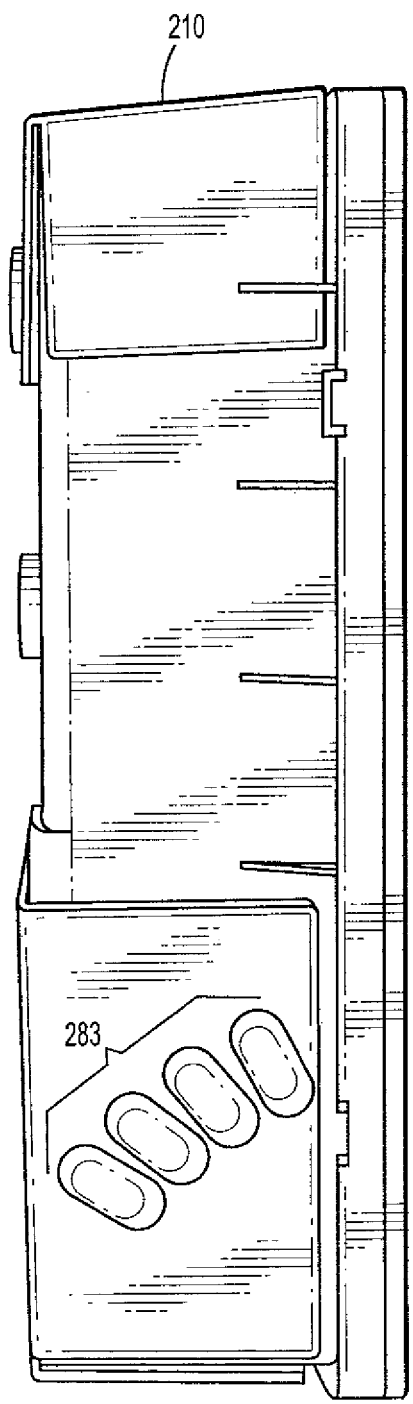
FIG. 8A shows a right side view of a housing, according to an embodiment of the present invention.
Figure 8B:
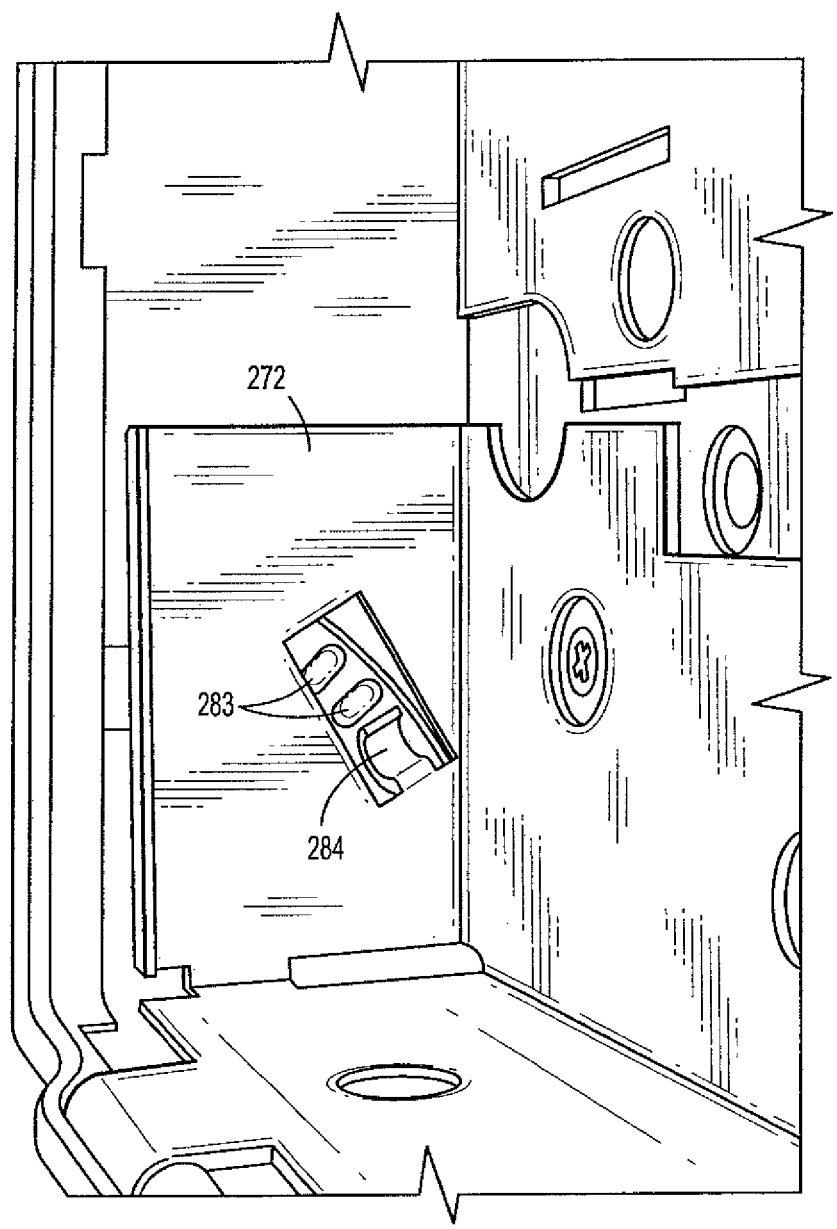
FIG. 8B shows a close-up view of the right inside portion of a housing, according to an embodiment of the present invention.

Referring to FIGS. 7A, 7C and 7D, the media unit 220 includes a plurality of holes 281 that receive a plurality of protruding portions 282 positioned on the bottom side 274 of the hinge structure 270. The plurality of protruding portions 282 line up with and fit in the plurality of holes 281 to aid in securing the media unit 220 to the hinge structure 270. Referring to FIGS. 8A-8B, the housing 210 includes a plurality of indentations 283 formed on left and right sides thereof. The indentations 283 are configured along a curve that, like groove 191, follows rotation of the media unit 220 with respect to the housing 210. The indentations 283 are designed to receive a tab portion 284 extending from each of right and left sides 272, 273 of the hinge structure 270. The tab portion 284 is, for example, curved in a "C" shape, and configured to fit into any one of the indentations 283. The combination of the tab portions 284 and the indentations 283 provide for angling the hinge portion 270, and a media unit 220 positioned therein, at multiple angles with respect to the housing 210, to, for example, control viewing angle. The engagement of the tab portion 284 with an indentation 283 secures the hinge structure 270 at a specific angle with respect to the housing 210 and prevents the hinge structure 270 from rotating forward or backward due to jostling, caused by, for example, movement of the vehicle.

Figure 9A:
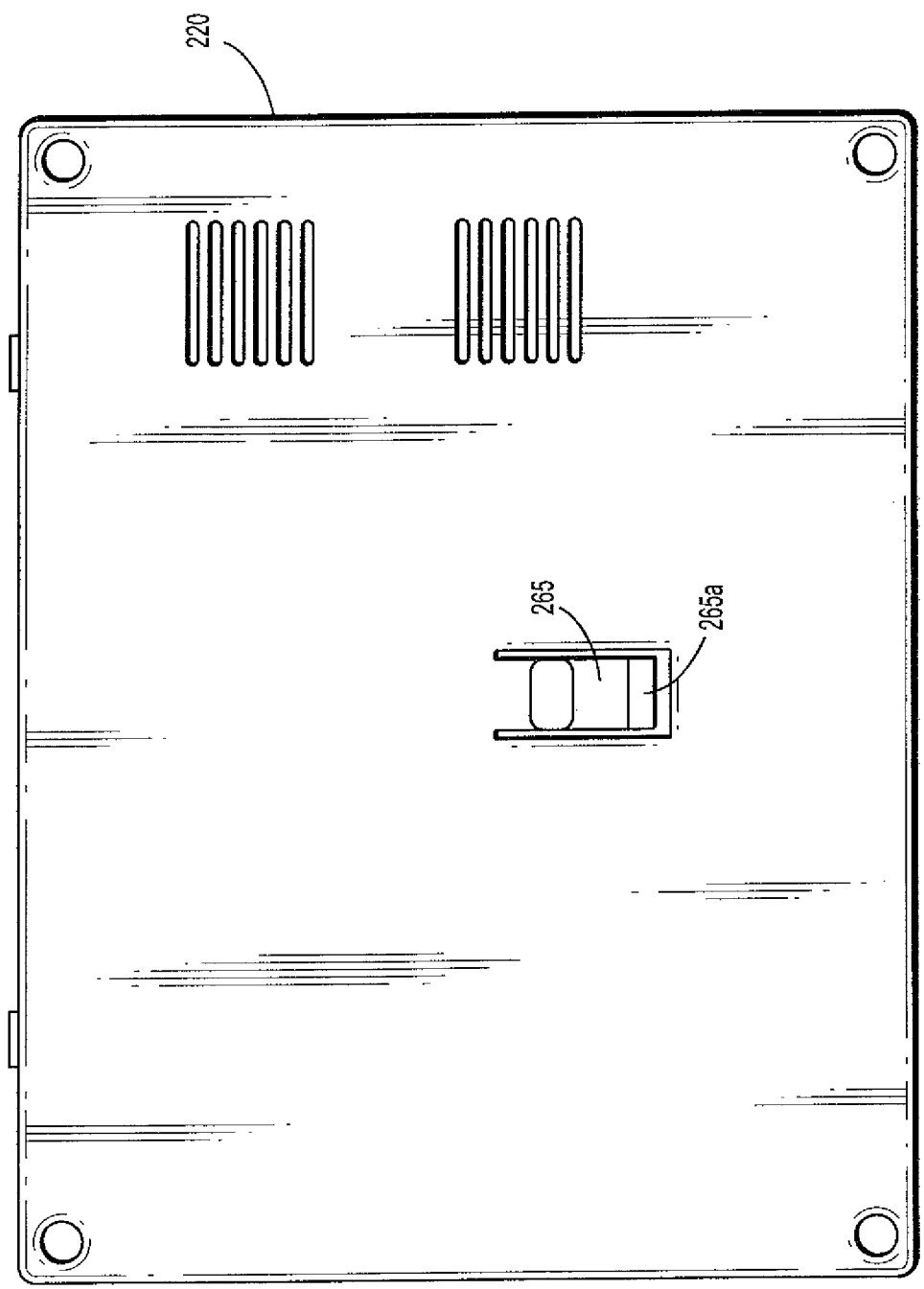
FIG. 9A shows a rear view of a media unit removed from a housing, according to an embodiment of the present invention.
Figure 9B:
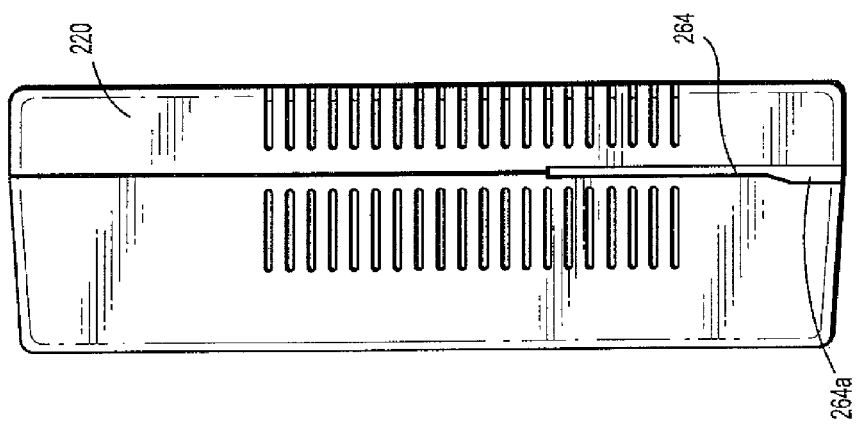
FIG. 9B shows a right side view of a media unit removed from a housing, according to an embodiment of the present invention.

Referring to FIGS. 9A-9B, the media unit 220, like the media unit 120, includes a flexible member 265 having a lip portion 265*a* for passing through an opening 278 in the hinge structure 270, and grooves 264 for engaging folds 272*a* and 273*a* of the hinge structure 270. The grooves 264 include a wide portion 264*a*, which facilitates positioning of the grooves 264 to engage the folds 272*a* and 273*a*.

According to an embodiment of the present invention, the housings 110 or 210 are installed in a replacement headrest for a vehicle. For example, a factory headrest is removed and replaced with the replacement headrest including the housing 110 or 210, which receives the media unit 120 or 220.

When displaying a vehicle at a vehicle dealership, the dealer removes the factory headrest and replaces the factory headrest with a replacement headrest including the housing 110 or 210. At this point, it is not necessary to electrically connect the entertainment system to the vehicle because a purchaser may not choose to have the entertainment system installed in the vehicle. Accordingly, the factory headrest is stored in safe place, such as, for example, in the trunk of the vehicle. In the event that the consumer does not want the entertainment system and requests the factory headrest with the vehicle, the replacement headrest is removed and the factory headrest is re-installed.

While on display in the dealership, a dealer may display a media unit that does not have working parts in the housing 110 or 210. In other words, the dealer may insert a mock-up media unit in the hinge structures 170 or 270 of the housing 110 or 210, so as to convey to a purchaser what the media unit will look like without risking damage to an actual media unit 120 or 220 by prospective purchasers visiting the dealership. In the event that a purchaser chooses to have an entertainment system installed in the vehicle, the dealer replaces the mock-up media unit with an actual media unit 120 or 220, and electrically connects the entertainment system to the vehicle by, for example, running wire leads through the headrest support rods 15 or through a top portion of the vehicle, to connect to a wire harness or distribution box (not shown) as described above.

In some instances, a consumer may also choose to keep the mock-up and replacement headrest for possible later installation. In such a situation, the dealer can sell the vehicle with the factory headrest, the replacement headrest, the mock-up, and an actual media unit 120 or 220 without making the electrical connections to the vehicle. The dealer may also provide the factory headrest to a consumer even if the consumer chooses the entertainment system.

Figure 10:
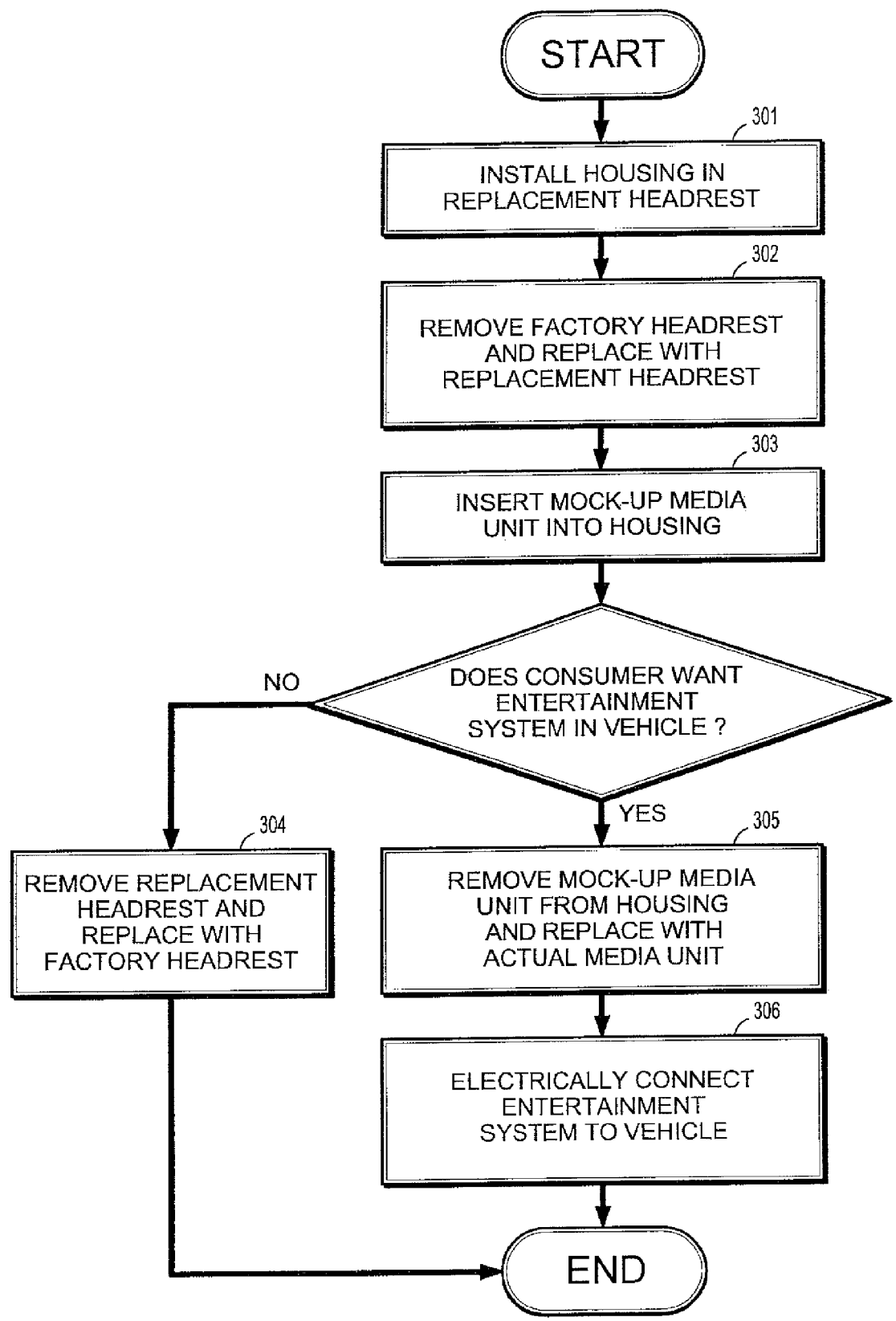
FIG. 10 is a flow chart showing a method of displaying an entertainment system for a vehicle seat, according to an embodiment of the present invention.

Referring to FIG. 10, a method of displaying an entertainment system for a vehicle seat is shown. As shown in FIG. 10, a housing 110 or 210 is installed in a replacement headrest (Step 301), a factory headrest is removed from the vehicle and replaced with a replacement headrest (Step 302), and a mock-up media unit is installed in the housing 110 or 210 by inserting the mock-up media unit into the hinge structure 170 or 270 (Step 303). If a consumer determines that it does not want the seat entertainment system in the vehicle, the process proceeds to Step 304, whereby the replacement headrest is removed and replaced with the factory headrest. If a consumer determines that it wants the seat entertainment system with the vehicle, the process proceeds to Step 305, whereby the mock-up media unit is removed from the housing and replaced with an actual media unit 120 or 220 inserted into the hinge structure 170 or 270. Then, at Step 306, the seat entertainment system is electrically connected to the vehicle by, for example, running wire leads through the headrest support rods 15 to connect to a wire harness or distribution box (not shown).

Although exemplary embodiments of the present invention have been described hereinabove, it should be understood that the present invention is not limited to these embodiments, but may be modified by those skilled in the art without departing from the spirit and scope of the present invention, as defined in the appended claims.

What is claimed is:

1. A media system, comprising:
a housing; and
a media unit capable of being coupled to the housing, wherein:
the housing comprises a receiving portion that pivots with respect to the housing and receives the media unit therein;
the receiving portion pivots between a closed position and open positions where the receiving portion is at an angle with respect to the housing;
the media unit comprises a display configured to display media content;
the receiving portion comprises a U-shaped hinge and is pivotably coupled to the housing;
the receiving portion surrounds the media unit on at least two sides of the media unit;
the receiving portion comprises a plurality of inward folds and an opening; and
the media unit comprises a plurality of grooves and a flexible member,
wherein the receiving portion is configured to secure the media unit via the inward folds engaging the grooves, and the flexible member fitting into the opening.

2. A media system, comprising:
a housing; and
a media unit capable of being coupled to the housing, wherein:
the housing comprises a receiving portion that pivots with respect to the housing and receives the media unit therein;
the receiving portion pivots between a closed position and open positions where the receiving portion is at an angle with respect to the housing;
the media unit comprises a display configured to display media content;
the media unit comprises a tab coupled to a handle; and
the housing comprises a groove shaped and dimensioned to receive the tab,
wherein the tab is extended and retracted by sliding the handle in opposite directions, an angle of rotation of the media unit with respect to the housing is limited to a range of approximately 0 degrees to approximately 45 degrees when the tab is engaged with the groove, and the angle of rotation of the media unit with respect to the housing is greater than about 45 degrees when the tab is not engaged with the groove.

3. The media system of claim 1, wherein:
the media unit comprises a wireless receiver capable of receiving the media content wirelessly; and
the media unit comprises a memory device configured to store the media content.

4. The media system of claim 2, wherein:
the media unit comprises a wireless receiver capable of receiving the media content wirelessly; and
the media unit comprises a memory device configured to store the media content.

* * * * *